United States Patent [19]

Shirai et al.

[11] Patent Number: 5,584,744
[45] Date of Patent: Dec. 17, 1996

[54] MACHINE TOOL

[75] Inventors: Takeki Shirai, Ichikawa; Munenori Watanabe, Tokyo, both of Japan

[73] Assignee: THK Co., Ltd., Tokyo, Japan

[21] Appl. No.: 209,727

[22] Filed: Mar. 14, 1994

[51] Int. Cl.⁶ .................................................. B24B 49/00
[52] U.S. Cl. ........................... 451/5; 451/9; 451/58
[58] Field of Search ........................... 451/14, 5, 8, 9, 451/57, 58

[56] References Cited

U.S. PATENT DOCUMENTS

| | | | |
|---|---|---|---|
| 3,085,371 | 4/1963 | Lessman | 451/14 |
| 4,662,122 | 5/1987 | Ohmura et al. | 451/5 |

FOREIGN PATENT DOCUMENTS

| | | | |
|---|---|---|---|
| 0730172 | 5/1955 | United Kingdom | 451/14 |

*Primary Examiner*—Robert A. Rose
*Attorney, Agent, or Firm*—Armstrong, Westerman, Hattori, McLeland & Naughton

[57] ABSTRACT

A machine tool is equipped with a feed screw unit for relatively moving a tool and a work to be worked and a contact detection means for detecting contact between the tool and the work, which is provided for a feed screw unit. With the feed screw unit is engaged a nut member and the nut member is provided with a minutely expandable member capable of being minutely or finely expanded or contracted in an axial direction of the nut member. The minutely expandable member is provided with a minutely expandable means, and the contact detection means is provided for the minutely expandable member. The contact detection means and the minutely expandable means are disposed in parallel or in series, or in combination, to each other with respect to an axial direction of a feed shaft.

12 Claims, 18 Drawing Sheets

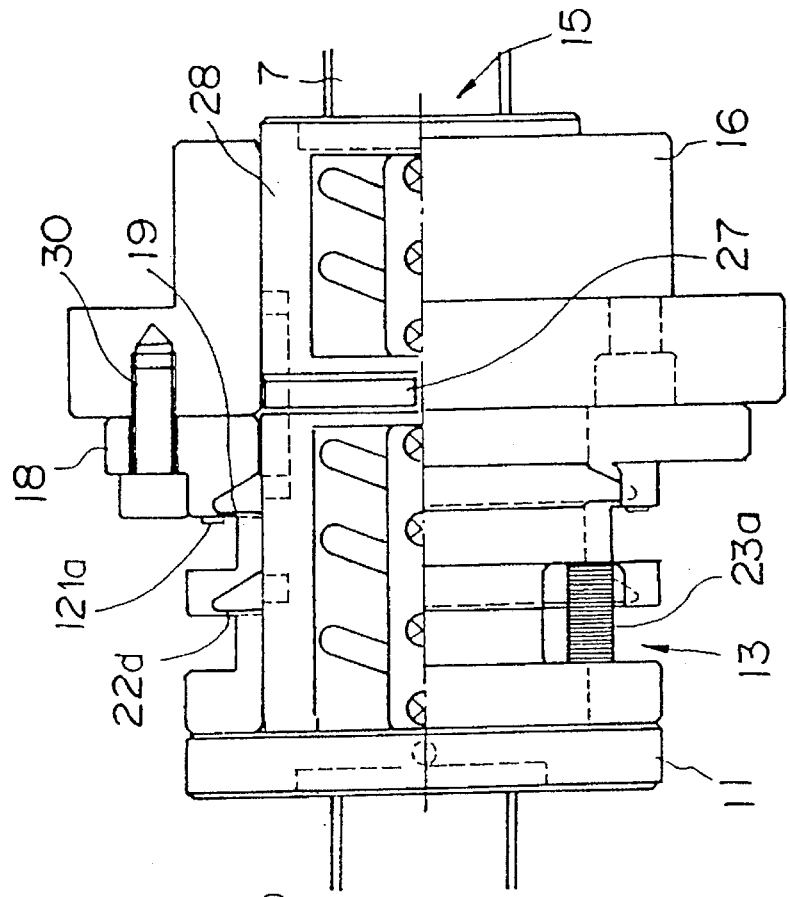
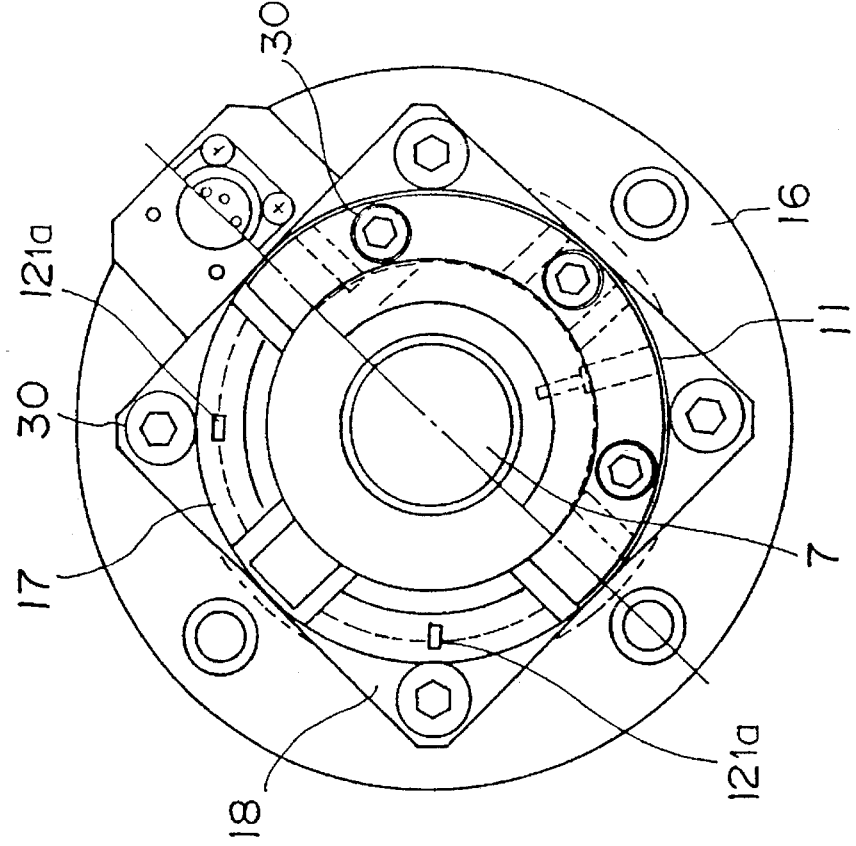
FIG.10 A
FIG.10 B

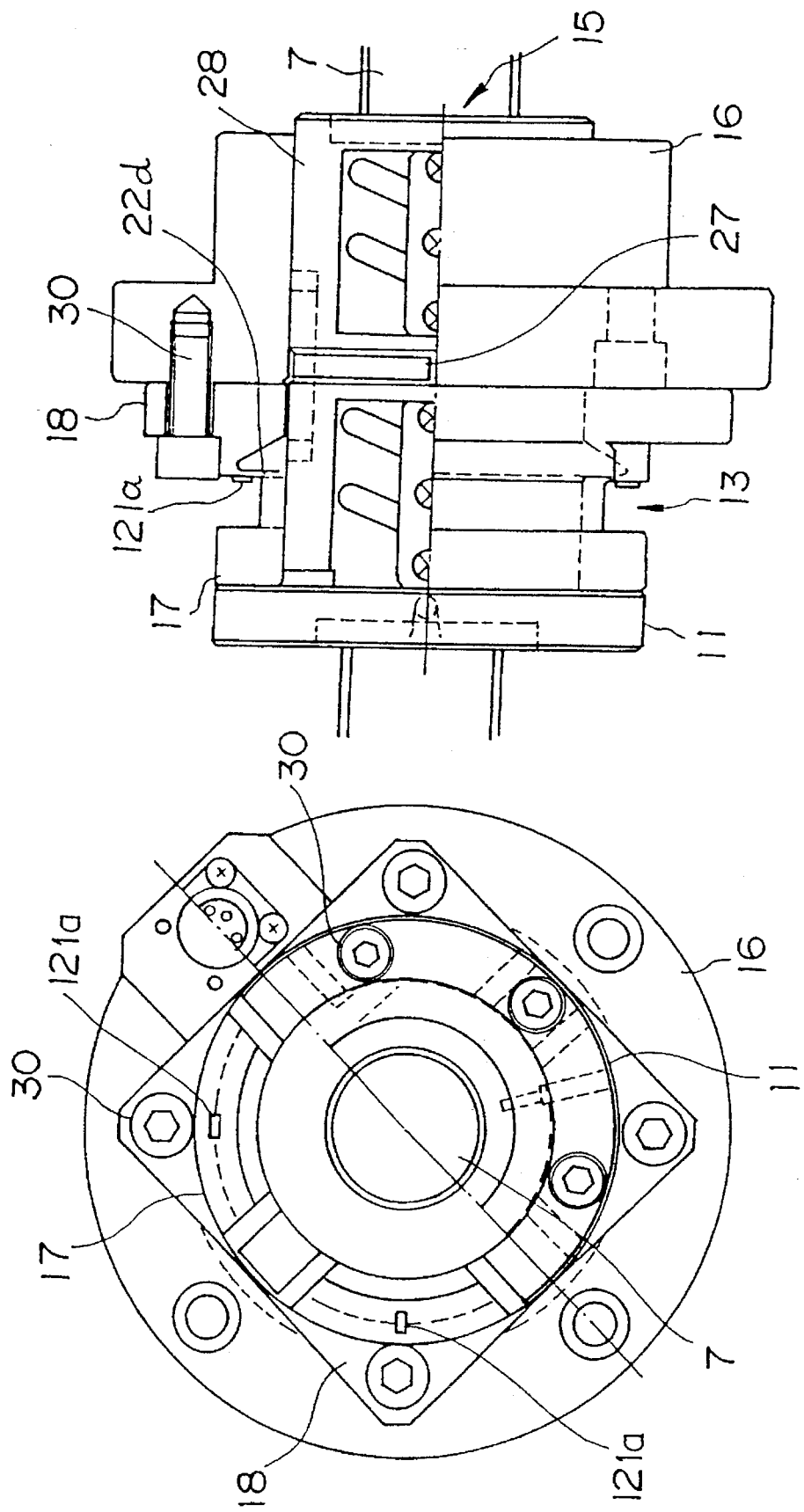

MACHINE TOOL

BACKGROUND OF THE INVENTION

The present invention relates to a machine tool for carrying out various workings such as grinding and cutting operations.

Prior art provides various machine tools which are provided with no means for detecting a contact of a tool to a work or workpiece to be worked. In a case where the machine tool is not provided with any contact detection means, it is impossible to know an exact time of contact of the tool to the work. For example, in a case where the tool is fed fast, there is a possibility that the releasing of this fast feeding has been done after the contact even if an operator has done the releasing operation just before the contact in his recognition or assumption and the tool in condition of the fast feeding contacts the work, which may result in a damage of the tool or work, or both. In order to avoid such possibility, in the prior art, it has been obliged to make delay a time of feeding operation for contacting the tool to the work.

Furthermore, in the prior art, there has been also provided a machine tool provided with means for detecting the contact of the tool to the work. For example, in such machine tool provided with the contact detection means, an ultrasonic wave sensor is disposed near the tool, for example, in a grinding solution, or near the work to detect change in vibration of an ultrasonic wave at times before and after the contact of the tool to the work to thereby detect the contacting thereof.

However, in such prior art machine tool, the machine tool itself or a system including the ultrasonic wave sensor is made large in size as well as providing of a complicated structure or arrangement. In particular, when the ultrasonic wave sensor is disposed near a work having an elongated size in its longitudinal direction, a plurality of ultrasonic wave sensors may be required, thus being complicated and inconvenient for the working operation.

The prior art further provides another type of a machine tool provided with means for detecting the contacting, in which an electric power meter is mounted to a driving means for driving the tool to detect change of power consumption before and after the contact of the tool to the work.

In such prior art, however, there is provided a problem of causing delay in detecting time corresponding to a unit time showing a quantity of the electric power energy detected by the electric power meter. The arrangement of an expensive power meter will result in increasing of total constructional cost.

Further, in another aspect, in the prior art machine tool, it is necessary to independently prepare and arrange a measuring device or the like for measuring a shape or size of the work to be worked.

In addition, the measurement of the shape of the work requires to once stop the movement of the workpiece, thus making troublesome the measuring working, being inconvenient.

Furthermore, in the conventional machine tool, when it is required to control a working force, a load cell means is utilized and located between the work and a vibration stopping member for the work, and the working force to be applied to the work is detected from an output from the load cell and adjusted by an operator by adjusting the vibration stopping member in response to the detected value of the working force. Such working also makes troublesome the entire operation of the machine tool, and in a particular case of the workpiece having a spline groove, spiral groove or the like specific shape, the countermeasure for such control has been itself made complicated.

Still furthermore, in the conventional machine tool, recognition or detection of abnormality of a tool and working conditions such as grinding force or resisting force has been done in accordance with a consumed power of an electric power meter provided for a driving means for driving the tool. However, as described hereinbefore, the detected result of the power meter involves a delay by an amount corresponding to a unit time, resulting in difficulty in a precise grasping of the exact working condition.

Still furthermore, in the conventional machine tool, when a minute cutting operation is performed, the resolving power of the cutting is decided by means of servo-motor and encoder. However, in a machine tool utilizing the servo-motor and the encoder, it is required to convert the rotary motion to the linear motion, and this conversion involves a limit in its performance, which makes it difficult to exactly perform the minute cutting working.

Still furthermore, in the conventional machine tool, when dimensions of the work are controlled by a dimension measuring device and it is required to correct working condition in case of a taper or circularity being disordered, such correction has been done by changing a program of a numerical control (NC) means in accordance with a corrected value of the dimension measuring device. This requires the change of the NC program every time the working correction, thus being troublesome and inconvenient.

The conventional machine tools further provide a difficulty for a countermeasure to an occurrence of such as chatter.

SUMMARY OF THE INVENTION

An object of the present invention is to substantially eliminate defects or drawbacks encountered in the prior art described above and to provide a machine tool having a compact structure capable of detecting contact between a tool and a work to be worked without obstructing a working operation.

Another object of the present invention is to provide a machine tool capable of detecting the contact between the tool and the work with high performance.

A further object of the present invention is to provide a machine tool capable of measuring a shape of the work without utilizing a specific measuring means.

A still further object of the present invention is to provide a machine tool capable of working the work easily with high performance while controlling a working force.

A still further object of the present invention is to provide a machine tool capable of easily detecting an abnormal condition of a tool and a working condition with high performance.

A still further object of the present invention is to provide a machine tool capable of performing a minute cutting operation with high performance.

A still further object of the present invention is to provide a machine tool capable of performing a working correction easily with high performance.

A still further object of the present invention is to provide a machine tool capable of providing high attenuation ability with respect to chatter at the working time.

These and other objects can be achieved according to the present invention by providing a machine tool characterized in that a contact detection means for detecting contact between a tool and a work to be worked is provided for a feed screw unit for moving the tool or the work.

In preferred embodiments, a nut member is screw engaged with the feed shaft unit and the nut member is provided with a minutely expandable member capable of being minutely expanded or contracted in an axial direction of the nut member. The minutely expandable member is provided with a minutely expandable means. The contact detection means is provided for the minutely expandable member.

The contact detection means and the minutely expandable means are disposed in parallel or in series, or in combination, to each other with respect to an axial direction of a feed shaft.

According to the structures or characteristic features of the present invention described above, the tool and the work to be worked are relatively moved by the feed shaft unit to establish the contact therebetween, which is detected by a contact detection means provided for the feed shaft unit.

In a case where a coordinate detection circuit is located, the coordinate of position at which the tool and the work contact is calculated by the coordinate detection circuit in response to a detection signal from the contact detection means. Accordingly, the shape of the work, a mounting position of the work, the wearing of the tool and the like can be measured.

Furthermore, in a case where a working force measuring circuit is provided, the working force measuring circuit converts a working force acting between the tool and the work at the detection of the contact therebetween by the contact detection means into an electric signal, which is then measured, and the driving of the feed shaft unit is controlled so as to achieve the optimum condition of the working force in accordance with the measured result, in addition to the detection of the lowering of the working ability or performance of the tool.

Still furthermore, in a case where the nut member screwed to the feed shaft unit is provided with a minutely expandable member capable of being expanded or contracted in the axial direction thereof, it becomes possible to perform the minute feeding only by the minutely expandable member without moving the feed shaft unit.

In a case where the minutely expandable member is provided with a piezoelectric element or electrostriction element, the minutely expandable member is expanded or contracted in response to a voltage applied, thus performing a feeding with fine and high resolution.

Furthermore, in a case where a working correction circuit is located, the minutely expandable member is controlled in accordance with the detected result of the coordinate detection circuit to thereby perform the working correction of the work with high performance.

Still furthermore, in a case where a dimension determining or measuring means is located, the minutely expandable member is controlled by the working correction circuit in accordance with the correction value from the dimension determining means.

It becomes further possible to control the expansion or contraction of the minutely expandable member in accordance with the measured result of the working measuring circuit to thereby effecting the working with optimum working force.

Still furthermore, in a case where an attenuation improving circuit is located, the minutely expandable member is controlled so as to eliminate a vibration.

Further natures and features of the present invention will be made more clear through the following descriptions with reference to the accompanying drawings.

BRIEF DESCRIPTION OF THE DRAWINGS

In the accompanying drawings:

FIGS. 8A, 8B and 9A, 9B are views showing structures of the contact detection means and the minutely expandable means in a parallel arrangement according to the present invention, in which FIG. 8A is a backside view of a nut member of the machine tool, FIG. 8B is a side view thereof, FIG. 9A is a side view of the nut member, FIG. 9B is a backside view thereof and FIG. 9C is a plan view thereof;

FIGS. 10A, 10B and 11A, 11B, 11C are views showing structures of the contact detection means and the minutely expandable means in a series arrangement according to the present invention, in which FIG. 10A is a backside view of a nut member of the machine tool, FIG. 10B is a side view thereof, FIG. 11A is a side view of a first nut of the nut member, FIG. 11b is a backside view thereof and FIG. 11C is a plan view thereof;

FIGS. 12A, 12B and 13A, 13B, 13C are views cases provided only with the contact detection means and no minutely expandable means, in which 12A is a backside view of a nut member of the machine tool, FIG. 12B is a side view thereof, FIG. 13A is a side view of the first nut of the nut member, FIG. 13B is a backside view thereof and FIG. 13C is a plan view thereof;

DESCRIPTION OF THE PREFERRED EMBODIMENTS

Preferred embodiments according to the present invention will be described hereunder with reference to the accompanying drawings.

Figure 1:
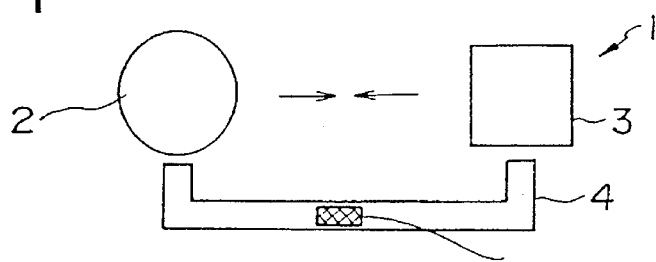
FIG. 1 is an illustration of brief arrangement of a machine tool according to the present invention.

Referring first to FIG. 1 showing an illustration of an arrangement of a machine tool 1 according to the present invention. The machine tool 1 is provided with a a feed shaft unit 4 for relatively moving a tool 2 and a work or workpiece 3 to be worked to contact them to each other, and the feed shaft unit 4 is equipped with a contact detection means 12 for detecting the contact of the tool 2 and the work 3.

Figure 2A:
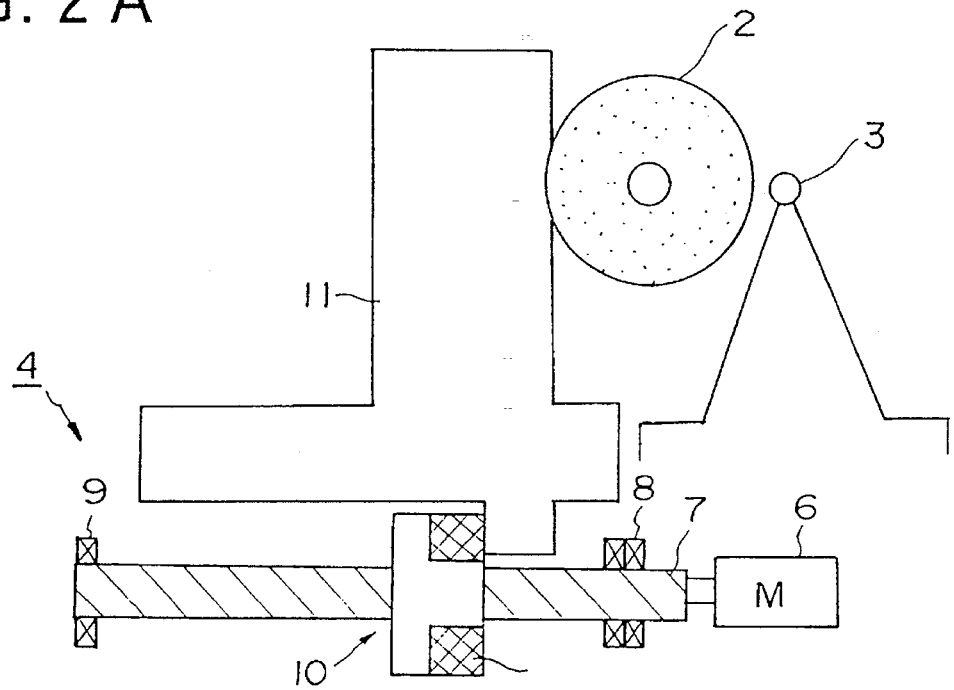
FIGS. 2A and 2B are views showing a concrete arrangement of the machine tool of FIG. 1.
Figure 2B:
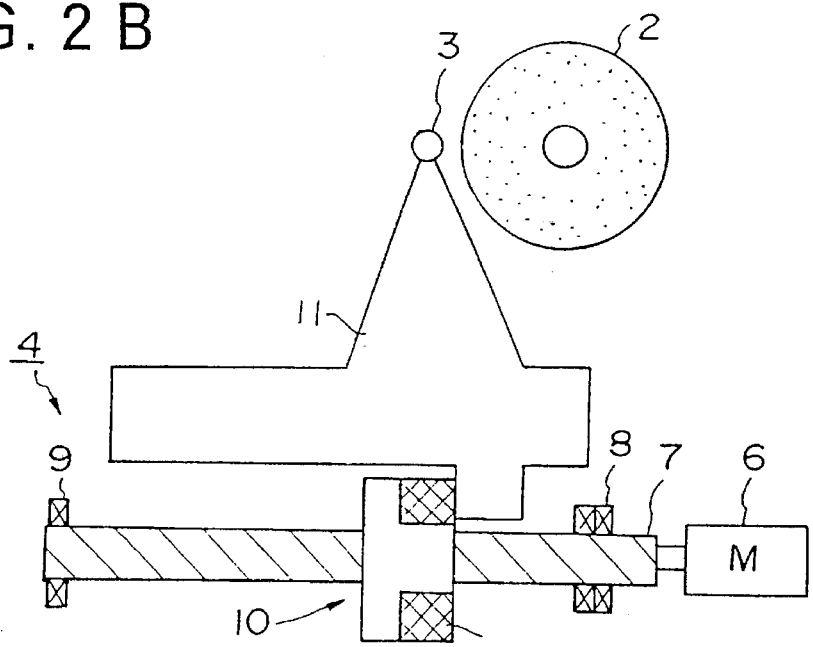

FIG. 2 is a view showing more concrete structure of the machine tool 1 of FIG. 1 and includes FIGS. 2A and 2B, in which FIG. 2A shows a state in which a grinding stone 2 as the tool and the work 3 as the workpiece are contacted by moving the grinding stone 2 towards the work 3 by means of the feed shaft unit 4 and FIG. 2B shows a state in which the grinding stone 2 and the work 3 are contacted by moving the work 3 towards the grinding stone 2. Further, in an example of FIG. 2, a grinding machine is explained as the machine tool, but other various machine tools such as milling machine, turning machine and machining center.

In the illustrated embodiment, the feed shaft unit 4 comprises an electric motor 6 as a driving means, a feed screw shaft 7 connected to the motor 6 through a driving shaft of the motor, bearings 8 and 9 for the feed screw shaft 7 and a nut member 10 linearly movable in accordance with the rotation of the feed screw shaft 7. The contact detection means 12 (12a) is provided at a minutely or finely expandable portion of the nut member 10, to which a member 11 to be fed for supporting the grinding stone 2 is secured.

Figure 3A:
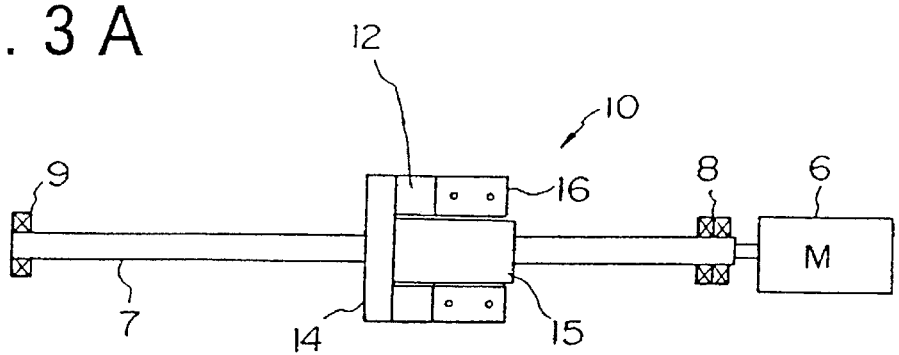
FIGS. 3A to 3D are illustrations showing arrangements of a contact detecting means and its associated members of the machine tool.
Figure 3B:
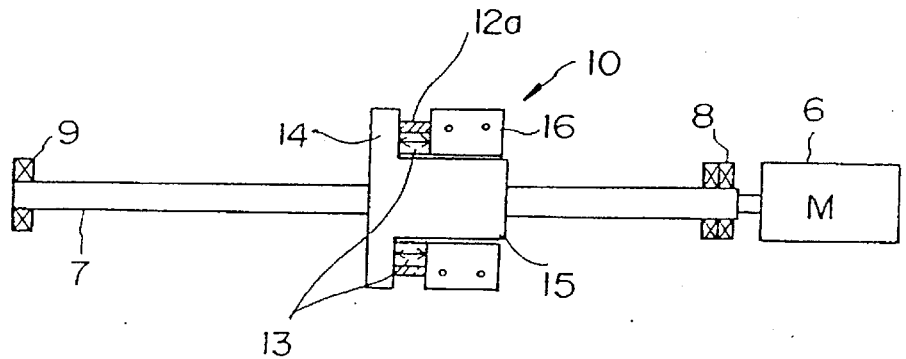

With reference to FIG. 3, particularly, FIG. 3B, the contact detection means 12 is disposed in side-parallel arrangement to a minutely expandable means 13 minutely expandable in a direction of the feed shaft for relatively biasing a distance between the grinding stone 2 and the work 3. The nut member 10 in the illustration is mounted to the feed screw 7 and comprises a body portion 15 to which a flange portion 14 is mounted through a rolling member, not shown, and a nut holder 16 movably mounted around the body portion 15 at a portion opposite to the flange portion 14, the member 11 to be fed being secured to the nut holder 16.

The contact detection means 12a is disposed between the flange portion 14 and the nut holder 16 with both ends of the detecting means 12a being secured to the flange portion 14 and the nut holder 16.

Figure 3C:
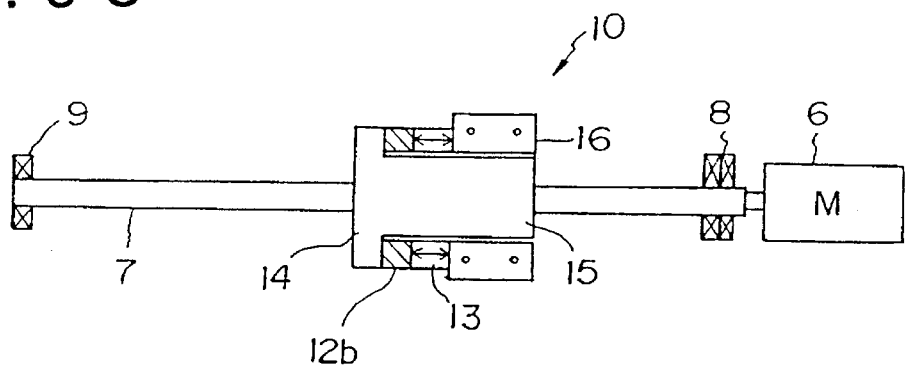

In an example of the illustration of FIG. 3C, the contact detecting means 12 (12b) is disposed in series arrangement with the minutely expandable means 13 with respect to the direction of the feed shaft 7. In this example, the contact detecting means 12b is composed of means capable of converting, into an electric signal, a physical amount to be changed by a force, called as work reaction force hereinbelow, applied to the member 11 to be fed through the grinding stone 2 when the grinding stone 2 contacts the work 3.

The following two processes or modes will be adapted for the detection of the contact of the grinding stone 2 and the work 3.

One is so-called a displacement (shift)-amount detection mode for detecting the contact by detecting the change of the distance, that is, shift-amount, between the flange portion 14 and the nut holder 16 of the nut member 10, and this is represented by the example of FIG. 3B. The other one is so-called a force detection mode for detecting the contact by detecting a magnitude of a load, that is, work reaction force itself, between the flange portion 14 and the nut holder 16, and this is represented by the example of FIG. 3C.

That is, in the example of FIG. 3B, since the contact detection means 12a is disposed in side-parallel arrangement to the minutely (finely) expandable means 13 in the feed shaft direction, the contact detection means 12a cannot directly detect the work reaction force and the shift-amount detection mode can be adapted. On the other hand, in the example of FIG. 3C, since the contact detection means 12b is disposed in series arrangement with the minutely expandable means 13 in the feed shaft direction, the contact detection means 12b cannot detect the shift-amount of the minutely expandable means 13 and the force detection mode can be adapted.

Figure 3D:
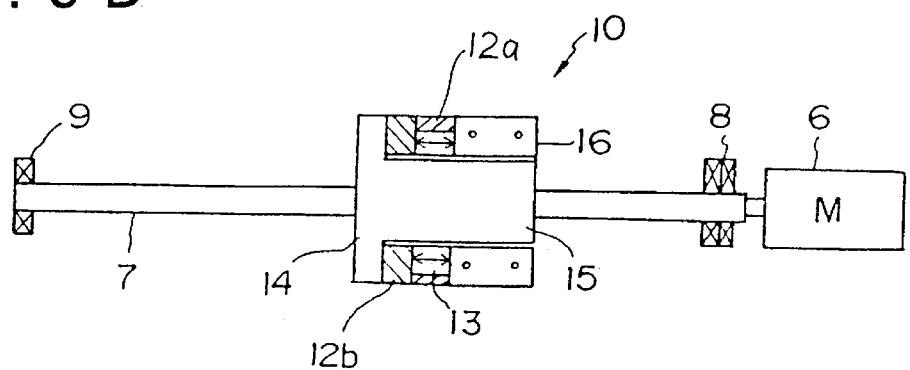

FIG. 3D shows an example of the combination of the examples of FIGS. 3B and 3C.

The example of FIG. 3B is further explained in detail with reference to FIGS. 4A to 4E. Referring to FIG. 4A, the contact detection means 12(12a) comprises of a voltage type sensor 122a detecting a displacement by utilizing a reverse piezoelectric effect of such as piezoelectric element or electrostriction element and the contact detection means 12 is disposed in parallel to the minutely expandable means between both the side end portions 17 and 18 of the holder.

Figure 4B:
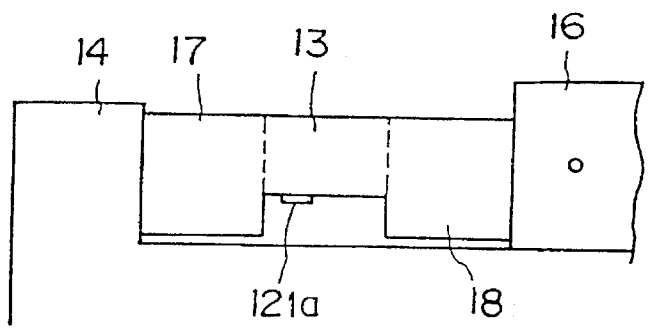
FIGS. 4A to 4G are various examples partially showing contact detection portions according to the present invention.
Figure 4A:
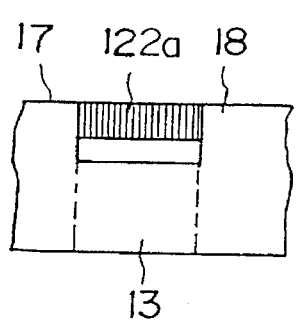

In FIG. 4B, a resistance type sensor 121a such as strain gauge is disposed in parallel to the minutely expandable means 13 between the flange side end portion 17 secured to the flange 14 and the holder side end portion 18 secured to the holder 16.

Figure 4C:
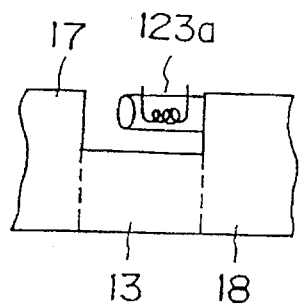
Figure 4D:
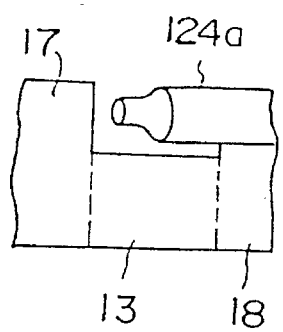
Figure 4E:
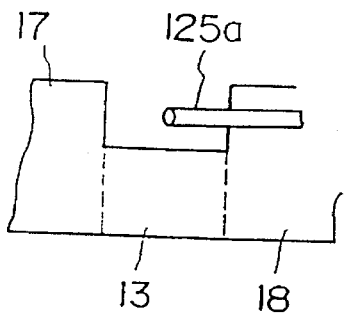

Furthermore, as shown in FIGS. 4C, 4D and 4E, there are utilized various known sensors such as an electromagnetic induction type sensor 123a (FIG. 4C) such as actuating transformer or eddy current sensor, an electrostatic capacitance type sensor 124a (FIG. 4D), and a light interference type sensor 125a (FIG. 4E) using an optical fiber.

Figure 4F:
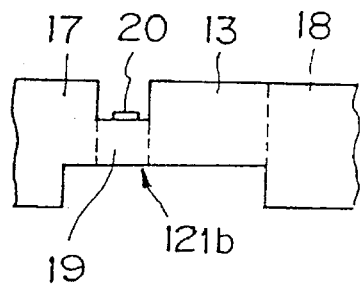
Figure 4G:
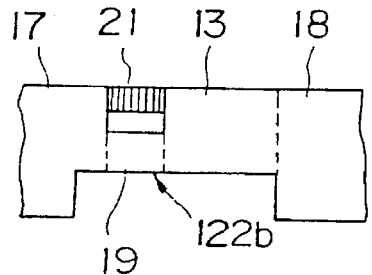

The example of FIG. 3C is further explained in detail with reference to FIGS. 4F and 4G. Referring to FIG. 4F, the contact detection means 121b comprises a strain gauge 20 detecting a strain amount of the elastic member 19, from which the axial load is detected. In FIG. 4G, the contact detection means 122b comprises a piezoelectric element 21 to be disposed side by side to the elastic member 19.

Other known sensor or means may be utilized for detecting force or the like as the contact detection means of the present invention.

Figure 5A:
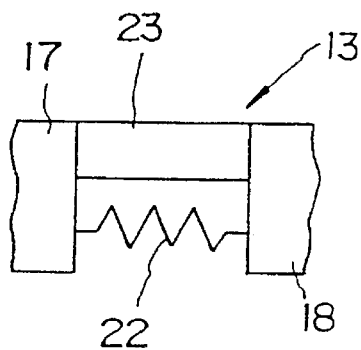
FIGS. 5A to 5E are various examples partially showing minutely expandable means in association with the contact detection means according to the present invention.
Figure 5B:
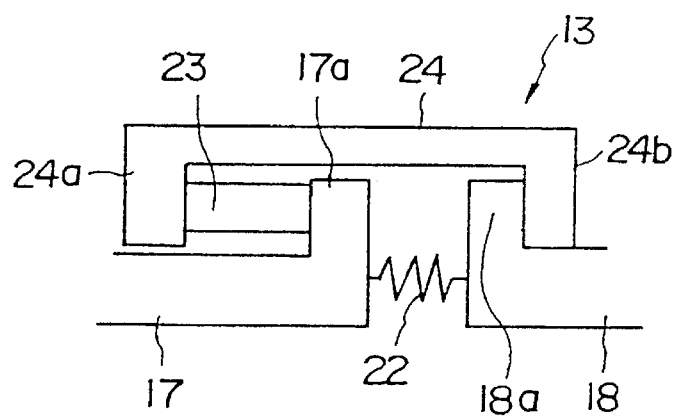

FIGS. 5A and 5B show examples of basic structures of the minutely expandable means 13, each of which is provided with an elastic member 22 being elastically deformable in the axial direction and rigid in the rotating direction of the shaft and a minutely (finely) biasing means 23 for axially expanding the elastic member 22. In the example of FIG. 5A, the elastic member 22 and the minutely biasing means 23 are disposed side by side between the flange side end portion 17 and the holder side end portion 18. In the example of FIG. 5B, only the elastic member 22 is disposed between the flange side end portion 17 and the holder side end portion 18, and flange portions 17a and 18a formed to the end portions 17 and 18 are engaged with a seat sleeve 24 having seat portions 24a and 24b projecting inward. The minutely biasing means 23 is disposed between the seat portions 24a, 24b and the flange portions 17a, 18a.

Figure 5C:
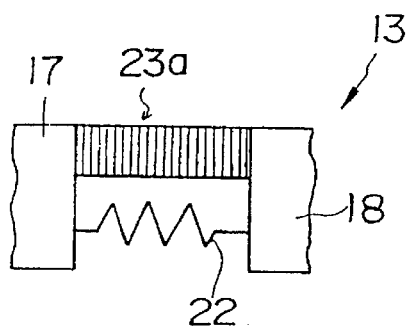
Figure 5D:
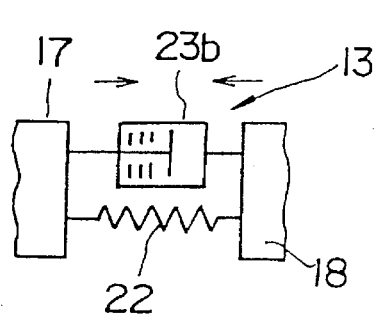

The minutely biasing means is a means expandable in proportion to a command value when applied, and as the minutely biasing means, in the present invention, there is adapted, for example, a piezoelectric element or electrostriction element 23a, or a thermo-actuator expandable in relation to thermal expansion of an object, as shown in FIG. 5C, or an actuator 23b expandable in response to a fluid pressure as shown in FIG. 5D, or other actuator utilizing a voice coil or magnetostriction element. That are, various actuators which is expandable in proportion to a command value when applied can be utilized.

Figure 6A:
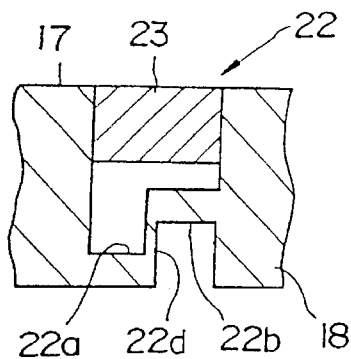
FIGS. 6A to 6I are various examples, some in plan views, partially showing elastic members in association with minutely biasing means according to the present invention.

FIG. 6A shows one example of the elastic member 22 comprises a plate spring 22d formed by a thin annular flat portion crossing with substantially a right angle with respect to the axial direction, and according to this shape, the spring 22d is deformable in the axial direction and rigid in the rotational direction. In the illustrated example, this thin elastic member 22d is formed by cutting out inner and outer peripheries of a cylindrical material integral with the end portions 17 and 18 so as to provide an integral structure. Further, in the illustrated example, grooves 22a, 22b each of rectangular cross section are formed to both axial end portions of the thin elastic member 22d, but as shown in FIG. 6B, grooves 22a, 22b each of triangular section may be formed instead of the rectangular form.

Figure 6B:
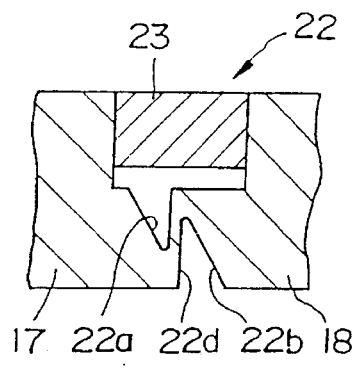
Figure 6C:
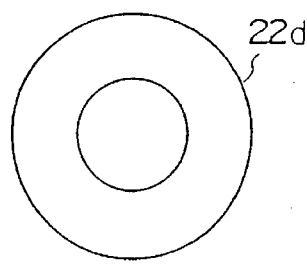
Figure 6D:
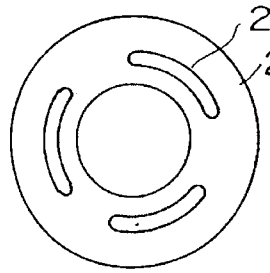
Figure 6E:
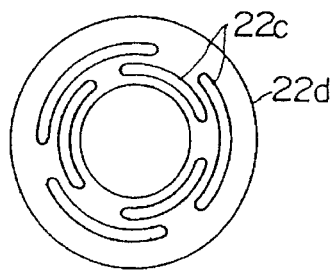

FIGS. 6C to 6E show brief plan views of the elastic member 22d, in which the elastic member 22d has an annular plate shape (FIG. 6C) and has a shape provided with slits 22c (FIGS. 6D and 6E).

Figure 6F:
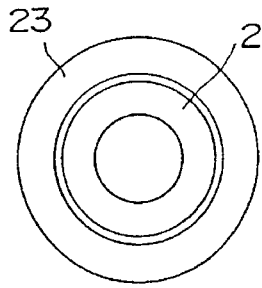
Figure 6G:
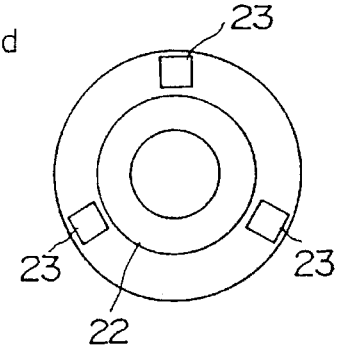
Figure 6H:
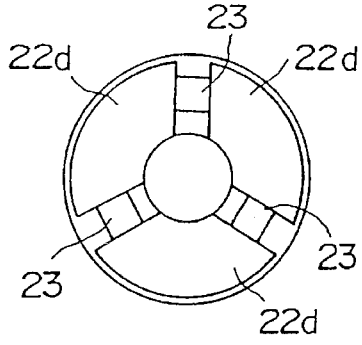

FIGS. 6F to 6H show arrangement of the elastic member 22 and the minutely biasing means 23, in which the elastic member 22 and the minutely biasing means 23 are concentrically arranged so as to provide a ring shape (FIG. 6F), the rod-like minutely biasing means 23 are arranged along the outer periphery of an annular elastic member 22 at three positions (FIG. 6G), and the rod-like minutely biasing means 23 are arranged and the elastic member 22 are sectioned into circumferential portions between which the rod-like minutely biasing means 23 are arranged respectively (FIG. 6H).

Figure 6I:
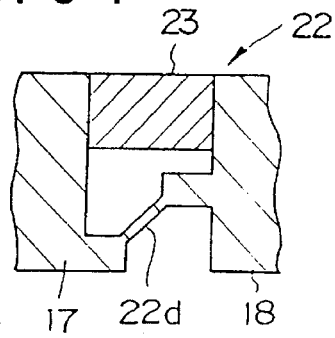

It is absolutely not necessary for the elastic member 22 to provide a thin annular flat plate shape such as shown in FIG. 6A or 6B, and for example, it may be formed as shown in FIG. 6I in which the elastic member 22 has an conical inclination toward the axial direction. That is, it is necessary for the elastic member 22 to have elasticity in the axial direction and rigid in the circumferential direction.

Figure 7:
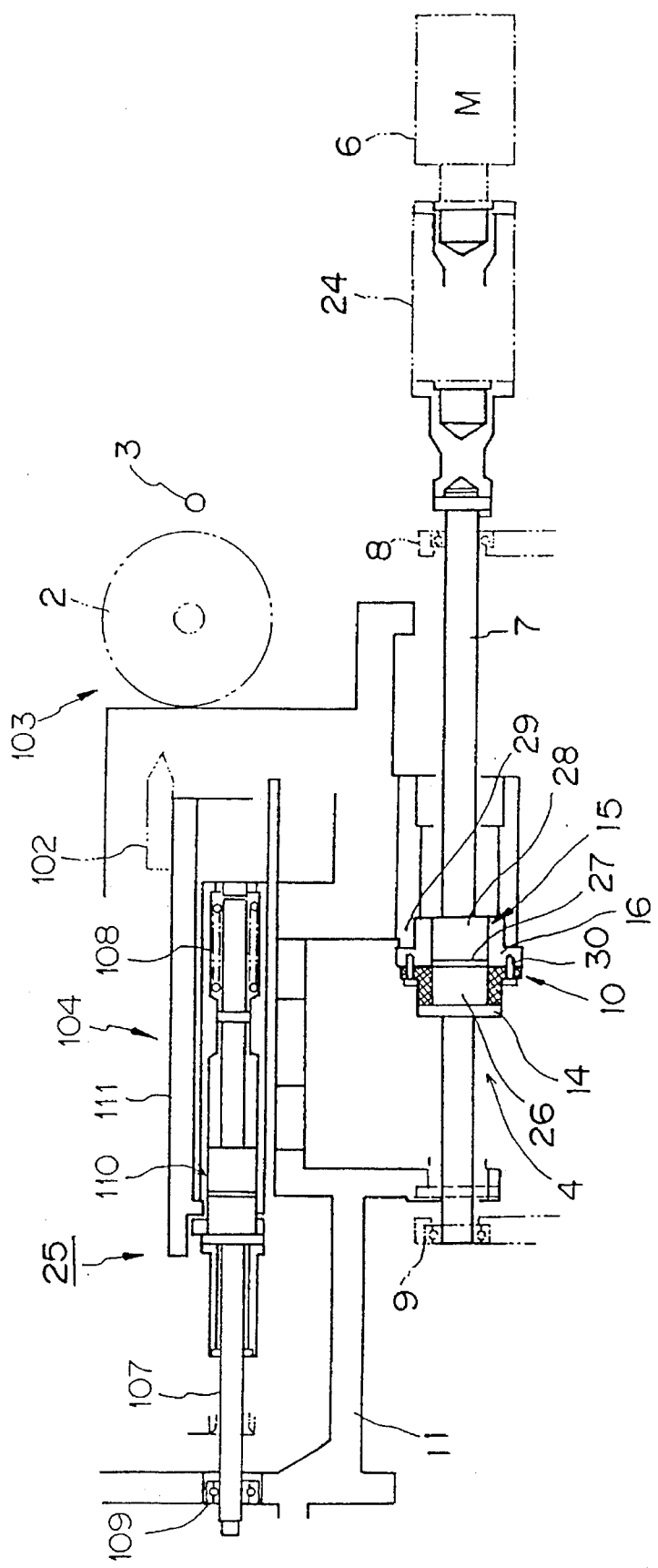
FIG. 7 is a schematic general view of a machine tool as a grinding machine according to the present invention.

FIG. 7 shows a general view of a structure of a a grinding machine as one example of a machine tool, in which a feed shaft unit 4 moves the grinding stone 2 toward the work 3 till the grinding stone 2 abuts against the work 3.

The feed screw unit 4 comprises a motor 6 as a driving means, a feed screw shaft 7 operatively connected to a drive shaft of the motor 6 through a cylinder 24 for absorbing a load rapidly applied, bearings 8, 9 for the feed screw shaft 7, and a nut member 10 linearly movable by the rotation of the feed screw shaft 7. The nut member 10 is secured to a member 11 to be fed provided with a dresser 25 supporting the grinding stone 2 and dressing the stone 2.

The nut member 10 comprises a nut body 15 and a nut holder 16 to be secured to the member 11 and is mounted to the feed screw shaft 7 through a rolling member, not shown. The nut body 15 is composed of a first nut 26 having one end to which a flange 14 is formed and a second nut 28 attached to the first nut 26 through a washer member 27. The nut holder 16 is fitted to the outer periphery of the nut body 15 on a side facing the flange 14, that is, to the outer periphery of the second nut 28 to be movable in the axial direction, and the nut holder 16 is secured to an engaging portion 19 of the member 11 to be fed.

One end of the contact detection means 12 is fixed to the flange 14 by bolt means 30 and the other end thereof is fixed to the nut holder 16 by bolt means 30.

The dresser 25 includes a feed screw unit 104 for moving a dress 102 as a tool toward the grinding stone 2 and contacting the dress 102 to the grinding stone 2. The feed screw unit 104 comprises a dress shaft 107 as a feed screw shaft operatively connected to a driving means, not shown, bearings 108, 109 for the dress shaft 107, and a nut member 110 linearly movable in accordance with the rotation of the dress shaft 107. A member 111 to be fed supporting the dress 102 is fixed to the nut member 110.

It will be easily noted that the former description can be applied to the dresser 25 by arranging a contact detecting means 112 to the feed shaft unit 104, and in this meaning, in the illustration of FIG. 7, reference numeral 100 is automatically added to members or elements corresponding to the former description. For example, the feed screw unit 104 corresponds to the feed screw unit 4 and the nut member 110 corresponds to the nut member 10.

FIGS. 8 through 13 are views showing details of the contact detection means 12 (112).

Figure 8A:
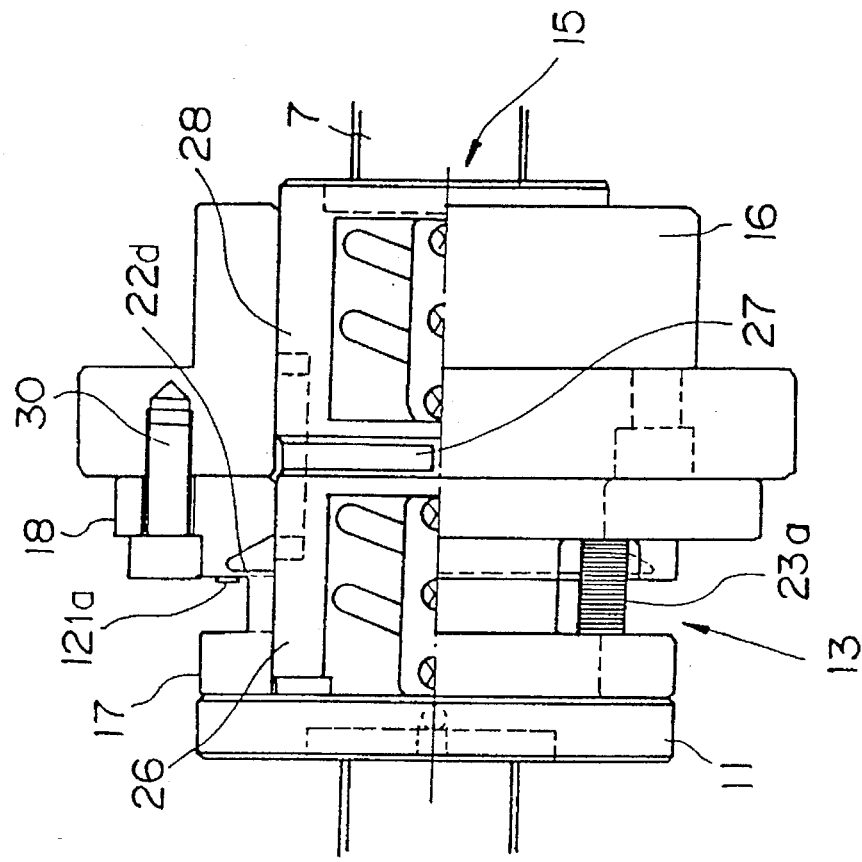
Figure 8B:
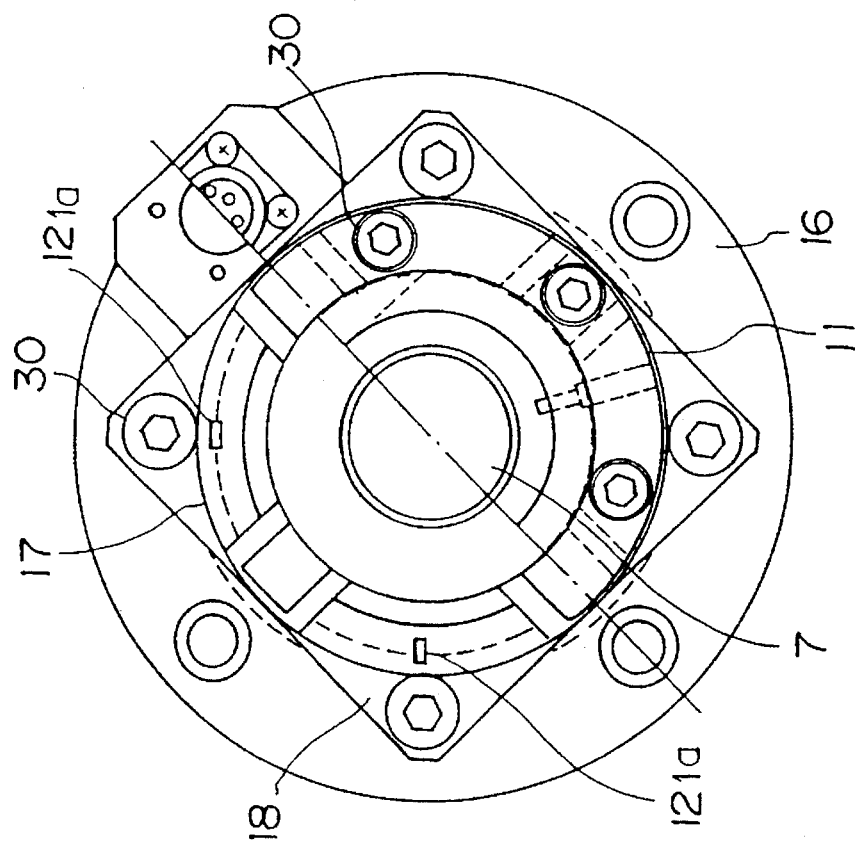

FIGS. 8 (8A, 8B) and 9 (9A, 9B) show the details of the structure shown in FIG. 3B, in which the minutely expandable means 13 and the contact detection means 121a are arranged in parallel to each other with respect to the feed shaft direction. The contact detection means 121a is of a type having a resistance sensor such as shown in FIG. 4A and a strain gauge is utilized. The minutely expandable means 13 is of a type having an elastic member and a minutely biasing means such as shown in FIG. 5A, and a piezoelectric element 23a is utilized as the minutely biasing means and an elastic member 22d such as shown in FIG. 6B, which is provided with a groove triangle in section on both sides along the axial direction, is utilized.

Figure 11A:
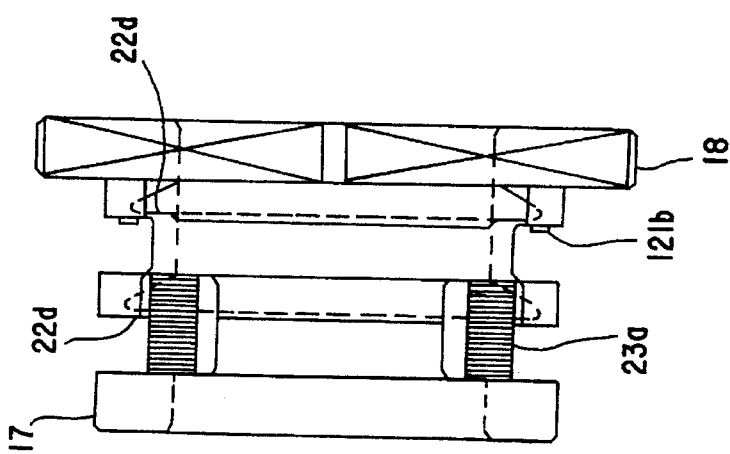
Figure 11B:
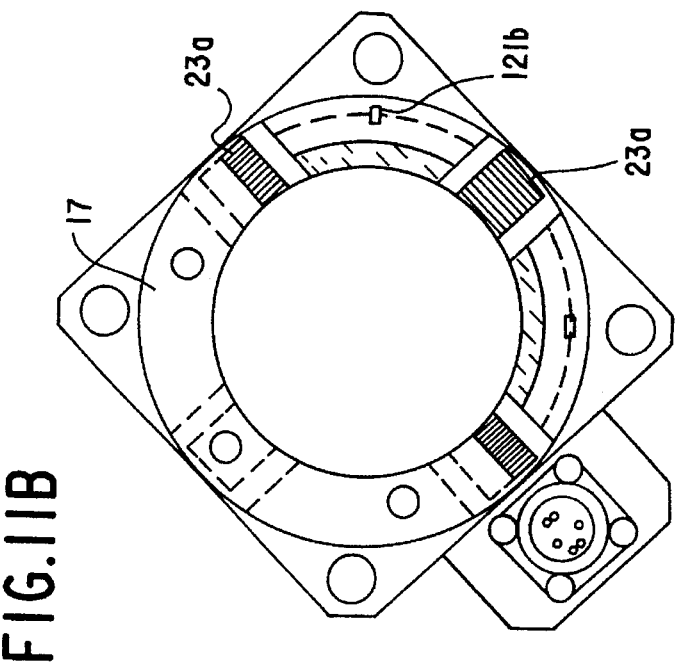
Figure 11C:
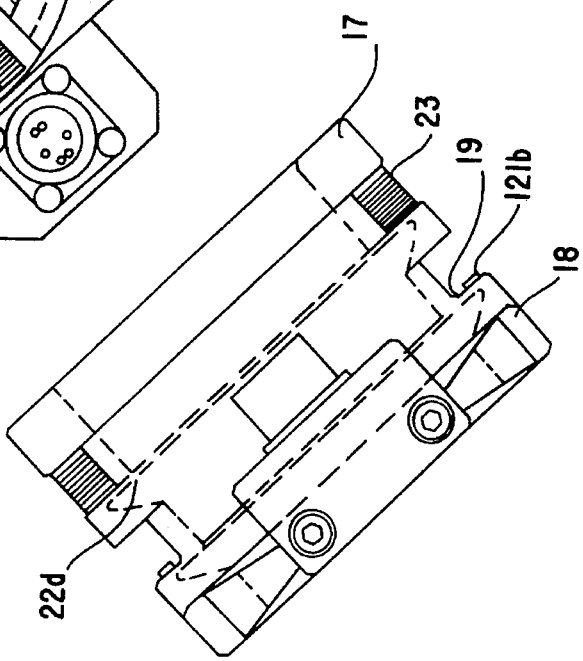

FIGS. 10 and 11 shows a structure of the type shown in FIG. 3C in detail in which the minutely expandable means 13 and the contact detection means 121b are arranged in series. The contact detection means 121b comprises a strain gauge such as that 20 shown in FIG. 4F. The minutely expandable means 13 has a structure substantially the same as that shown in FIG. 8 or 9.

Figure 13:
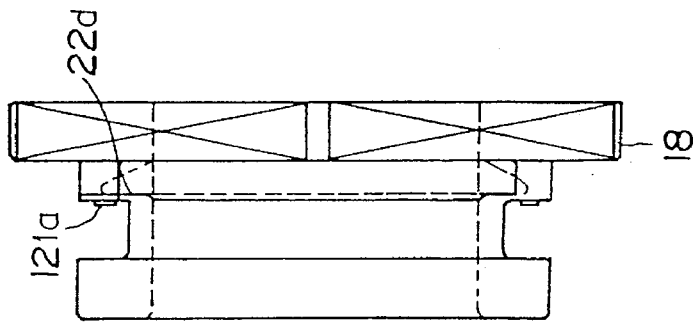
Figure 13:
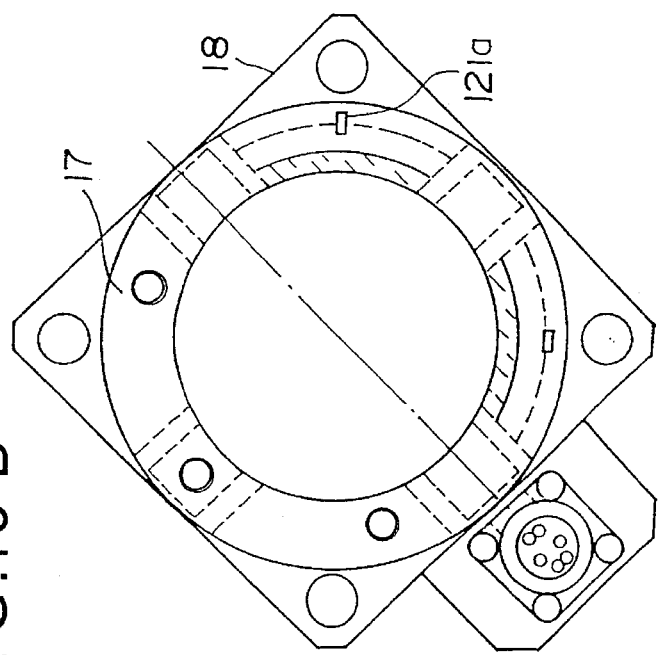
Figure 13:
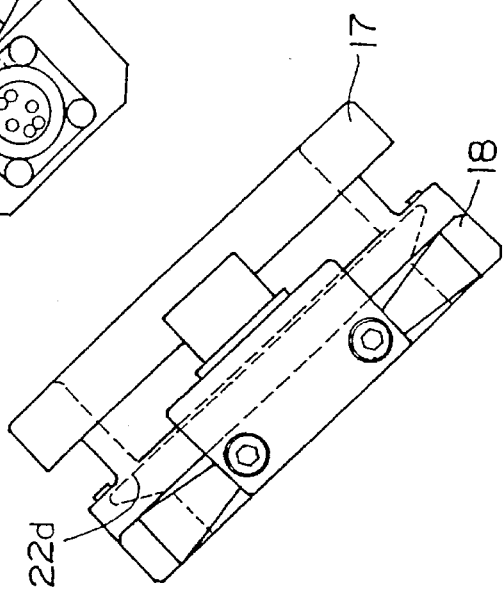

FIGS. 12 and 13 shows an example having only the contact detection means and not provided with the minutely expandable means. In this example, the contact detection means employs a displacement detection system such as strain gauge 121a shown in FIG. 4A.

Figure 14:
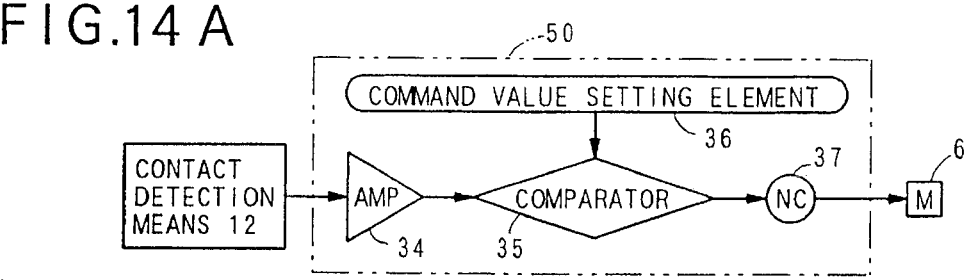
FIGS. 14A to 14F show various examples of block diagrams representing control circuits according to the present invention.
Figure 14:
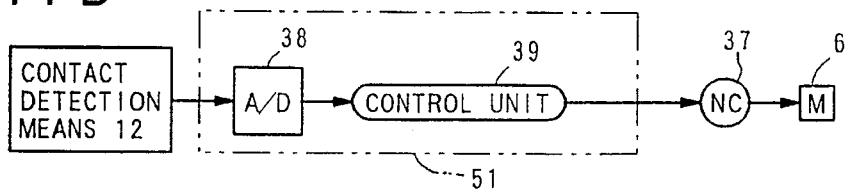
Figure 14:
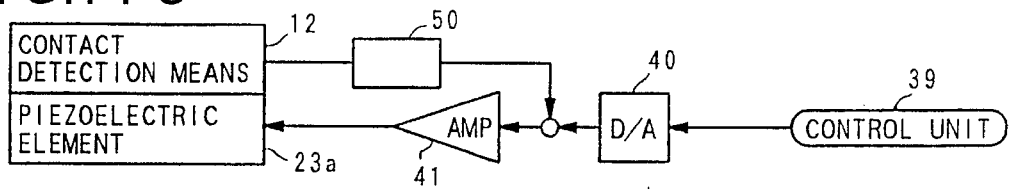
Figure 14:
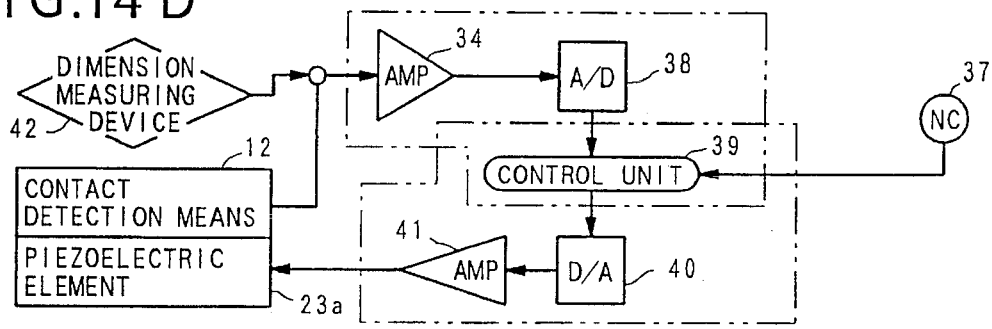
Figure 14:
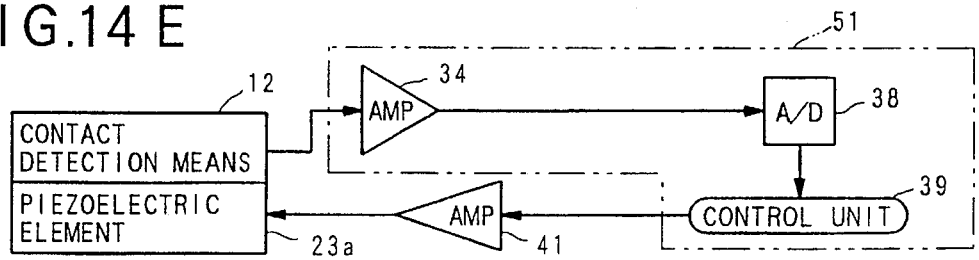
Figure 14:
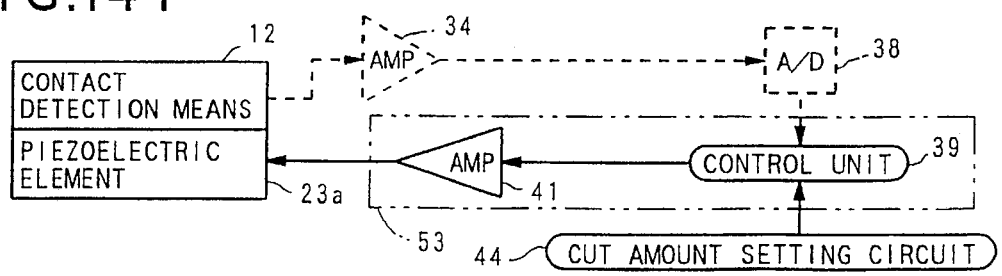

FIG. 14 represents various block diagrams of a control circuit according to the present invention.

FIGS. 14A and 14B are examples representing cases of control circuits only for the arrangement of the contact detection means 12.

FIG. 14A shows a control circuit which comprises the contact detection means 12 acting to convert a physical amount varied by a working reaction force when the grinding stone 2 contacts the work 3 into an electric signal and a coordinate detection circuit 50 for obtaining coordinate of a position at which the grinding stone 2 contacts the work 3 in response to the signal from the contact detection means 12. The coordinate detection circuit 50 comprises an amplifier 34 for amplifying a signal from the contact detection means 12, a comparator 35 for comparing the amplified signal with a command signal from a command value setting element 36, and an NC (numerical control) unit 37 for discriminating the fact of contacting or not contacting in response to a signal from the comparator 35, detecting the coordinate of the position at which the grinding stone 2 and the work 3 are contacted, and controlling the motor 6 in accordance with the thus discriminated and detected results.

FIG. 14B shows a structure comprising the contact detection means 12 for converting the variation due to the work reaction force at a time of contacting of the grinding stone 2 to the work 3 into an electric signal, a working force measuring circuit 51 for converting the working force acting at the contacting time to an electric signal and measuring the signal, and an NC unit 37 for discriminating the fact of contacting or not-contacting in response to the working force calculated by the working force measuring circuit 51 and controlling the motor 6 in response to the discrimination. The working force measuring circuit 51 comprises an A/D convertor 38 converting a magnitude of the signal from the contact detection means 12 into a digital value and a control unit 39 for calculating a working force in response to the digital value converted by the A/D convertor 38.

FIGS. 14C, 14D, 14E and 14E are examples of the structures each constituted by the contact detection means 12 and the piezoelectric element 23a such as shown in FIGS. 3B and 3C.

FIG. 14C shows an example of a structure comprising a control unit 39 transmitting a command value for enabling a high resolution feeding, a D/A convertor 40 for converting the command value into an analog value, an amplifier 41 for amplifying a voltage of a value corresponding to the converted command value, a piezoelectric element 23a constructing a minutely expandable means expandable in response to that voltage, and the contact detection means 12 capable of detecting a cut amount varied in accordance with the degree of expansion of the minutely expandable means.

FIG. 14D shows an example of a structure comprising an NC unit 37 inputting an aimed shape of the work, a control unit 39 for transmitting a command in response to the inputted value from the NC unit 37, an A/D convertor 40 for converting the outputted value into an analog signal, an amplifier 41 for amplifying a voltage of a value corresponding to the converted analog signal, a piezoelectric element 23a constituting a minutely expandable means expandable in response to that voltage, the contact detection means 12 capable of detecting a dimension variable in accordance with the minute cut amount due to the expansion of the minutely expandable means, an amplifier 34 for amplifying the value detected by the detection means 12, and an A/D convertor 38 for converting the amplified value into a digital value and then inputting the digital value to the control unit 39. In this example of FIG. 14D, the amplifier 34, the A/D convertor 38 and the control unit 50 constitute a coordinate detection circuit 50, and the control unit 39, the A/D convertor 38 and the amplifier 41 constitute a working correction circuit 52.

Figure 15:
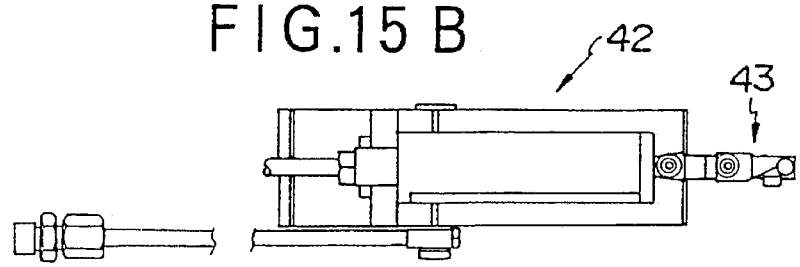
FIGS. 15A to 15D are views of a dimension determining or measuring means utilized for the machine tool according to the present invention viewed from various directions.
Figure 15:
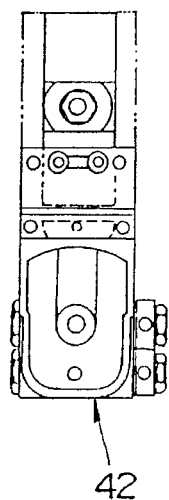
Figure 15:
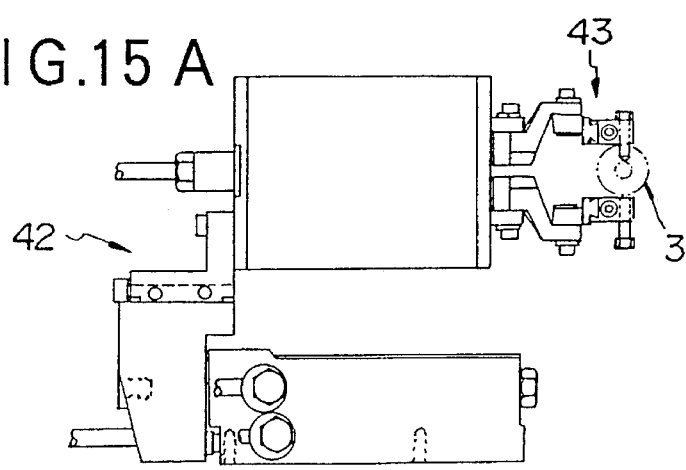
Figure 15:
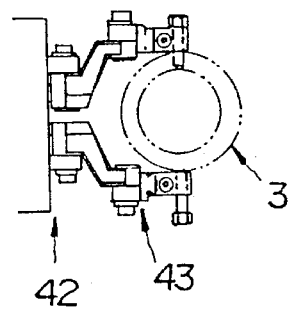

In a modification, it may be possible to utilize a dimension determining or measuring means 42 for the dimension management or control to feedback the measured result to the control circuit 39 through the amplifier 34 and the A/D convertor 38. In this connection, FIG. 15 shows one example of such dimension determining means 42, in which the dimension can be measured by moving an arm 43 so as to clamp the work 3.

FIG. 14E is an example of a structure comprising the contact detection means 12, a working force measuring circuit 51 for converting the working force acting between the grinding stone 2 and the work 3 at the contacting time thereof into an electric signal and measuring the working force from the signal, a control unit for outputting a command value in accordance with the measured result of the working force measuring circuit 51, an amplifier 41 for amplifying a value of voltage corresponding to the command value, and a piezoelectric element 23a as a minutely biasing means to which that voltage is applied. The working force measuring circuit 51 comprises an amplifier 34, an A/D convertor 38 and the control unit 39.

FIG. 14F is an example of a structure comprising a cut amount setting circuit 44 for setting a cut amount, a control unit 39 for outputting a command value in response to the set value, an amplifier 41 for amplifying a voltage of a value corresponding to the command value, and a piezoelectric element 23a as a minutely biasing means to which that voltage is applied. In this example, the control unit 39 and the amplifier 41 constitutes an attenuation improving circuit 53.

The embodiments of the present invention of the structures described above attain the following functions and effects.

With reference to FIG. 1, the tool 2 and the work 3 to be worked are relatively moved by the feed shaft unit 4 to contact to each other, and the contact detection means 12 detects at its position the fact of the contact.

With reference to FIG. 2A, the feed screw shaft 7 supported by the bearings 8 and 9 are driven to rotate by the motor 6, thereby the nut member 10 is linearly moved. At this time, the member 11 to be fed secured to the nut member 10 is also linearly moved together with the nut member 10. Accordingly, the grinding stone 2 supported by the nut member 10 is contacted to the work 3 or separated therefrom, thereby carrying out the working operation, grinding operation in this embodiment. The contacting condition is detected by the contact detection means 12 provided for the nut member 10.

On the contrary, with reference to FIG. 2B, the grinding stone 2 is contacted to the work 3 by moving the work towards the grinding stone by the feed shaft unit 4. The other operation can be done in the same manner as stated above with reference to FIG. 2A.

With reference to FIGS. 1 and 2, the grinding stone 2 or the work 3 is fed fast till the grinding stone 2 contacts the work 3, and when the grinding stone 2 contacts the work 3, the feed shaft unit 4 can be controlled to feed the grinding stone 2 or the work 3 slowly after the detection of the contacting therebetween, thus saving a loss time in the operation.

Since the contact detection means 12 is mounted to the feed screw unit 4, it is not necessary to dispose the contact detection means near the tool or work as in the conventional mechanism or system utilizing an ultrasonic sensor or the like. Accordingly, the contact detection means 12 does not obstruct the working operation and provides the compact structure.

Particularly, since the contact detection means 12 is mounted to the feed shaft unit 4, the contacting condition of a work having a long length can be detected only by one contact detection means, thus eliminating the location of a plurality of sensors as in the conventional mechanism or system.

Furthermore, in one conventional example, in which a power meter is utilized for detecting the contact between the grinding stone and the work, but in such detection method, the delay in the detection result by an amount corresponding to the unit time because the power meter indicates an electric energy amount per unit time. However, according to the contact detection means of the embodiment of the present invention, the detection is performed by converting a physical amount changed by the work reaction force into an electric signal and then detecting the signal, thus eliminating such delay in the detection timing, whereby the contact detection performance can be remarkably improved. No use of such power meter can save the cost.

The example of FIG. 3A shows a case utilizing only the contact detection means 12 being either one of displacement detection type or force detection type. The examples of FIGS. 3B and 3C show cases utilizing the contact detection means 12 and the minutely expandable 13, whereby the minute feed of the grinding stone 2 can be done by the minutely expandable means 13 as well as the contact detection by the contact detection means 12.

That is, the nut holder 16 is finely reciprocated in the axial direction on the outer periphery of the nut body 15 by minute expansion or contraction of the minutely expandable means 13, whereby the member 11 to be fed secured to the nut holder 16 can be also reciprocated and the grinding stone 2 supported by the member 11 can be also reciprocated, thus performing the minute feeding of the grinding stone 2.

Since the minute feeding can be performed by the minutely expandable means 13, the minute cutting becomes possible with high performance. On the contrary, in a conventional mechanism or system which can perform the minute feeding, an encoder is mounted to a motor and the amount to be fed is decided by the resolution of the encoder, so that it is required to convert a rotation motion to a linear motion, which involves troublesome problem or operation, thus being inconvenient and achieving no good performance. In the present invention, the minute feeding can be achieved by the minutely expandable means 13 without utilizing the motor, whereby the minute feeding can be made possible with high performance.

In the embodiment of FIG. 4A, the contact detection means of the displacement detection type is utilized, and in the case where the contact detection means of this type is composed of a resistance sensor 121a, when the distance between the flange side end portion 17 and the holder side end portion 16 is changed, the resistance sensor 121a is distorted to change the resistance, from which the displacement or biased amount can be detected.

In the embodiment of FIG. 4B, in the case where the contact detection means of this type is composed of a voltage sensor 122a, the displacement amount or biased amount can be detected from the voltage, i.e. potential, change.

In the embodiment of FIG. 4C utilizing an electromagnetic induction type sensor 122a, the displacement amount is detected from the change in the electric field or magnetic field caused at the time of displacement.

In the embodiment of FIG. 4D utilizing a electrostatic capacitance type sensor 124a, the displacement amount is detected from the electrostatic capacity changed at the time of displacement.

In the embodiment of FIG. 4E utilizing a light interference type sensor 125a, the displacement amount is detected from the shifting of a phase of light wave at the time of displacement.

In the embodiment of FIG. 4F, in the case where a contact detection means of a force detection type is utilized and the contact detection means of this type is provided with an elastic member 19 and a strain gauge 20, the axial load is detected from the detection value of the distortion of the elastic member 19.

In the embodiment of FIG. 4G, in the case where the contact detection means of this type is provided with the elastic member 19 and a piezoelectric element 21, the axial load can be detected from the distortion amount of the elastic member 19 caused by the voltage change of the piezoelectric element 21.

In the embodiment of FIGS. 5A and 5B in which the axially expandable means is provided with the elastic member 22 and the minutely biasing means 23, when a command is applied to the minutely biasing means 23, the minutely biasing means is expanded or contracted by an amount proportional to the command value and, in accordance with the expanded or contracted amount, the elastic member 22 is expanded or contracted.

In the embodiment of FIG. 5C utilizing the piezoelectric element or electrostriction element 23a as the minutely biasing means 23, the minutely biasing means is expanded or contracted in response to an applied voltage as the command value.

Figure 5E:
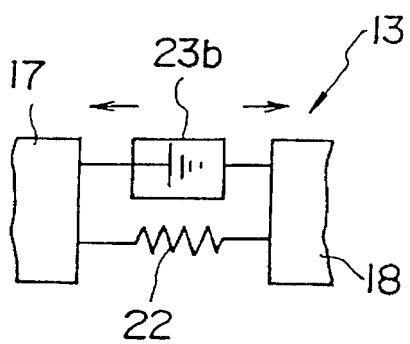

In the embodiment of FIGS. 5D and 5E, the minutely biasing means 23b is expanded or contracted by a fluid pressure.

When the elastic members 22 shown in FIG. 6 are utilized, the elastic members are made rigid in the circumferential direction and elastically deformable in the axial direction in any one of the examples.

In the embodiment of the machine tool of the present invention having a structure shown in FIG. 7, the feed screw shaft 7 is rotated by means of the motor 6 and the nut member 10 is then moved linearly. Accordingly, the member 11 to be fed fixed to the nut member 10 is also moved linearly, thereby feeding the grinding stone 2 supported by the member 11.

Figure 9A:
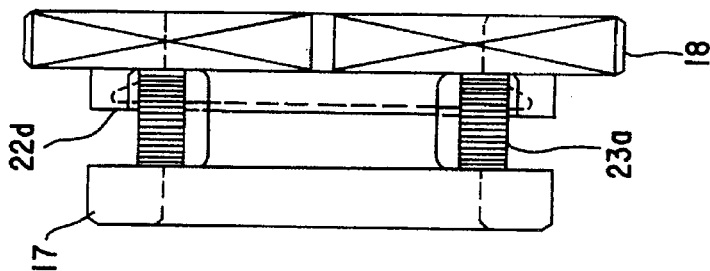
Figure 9B:
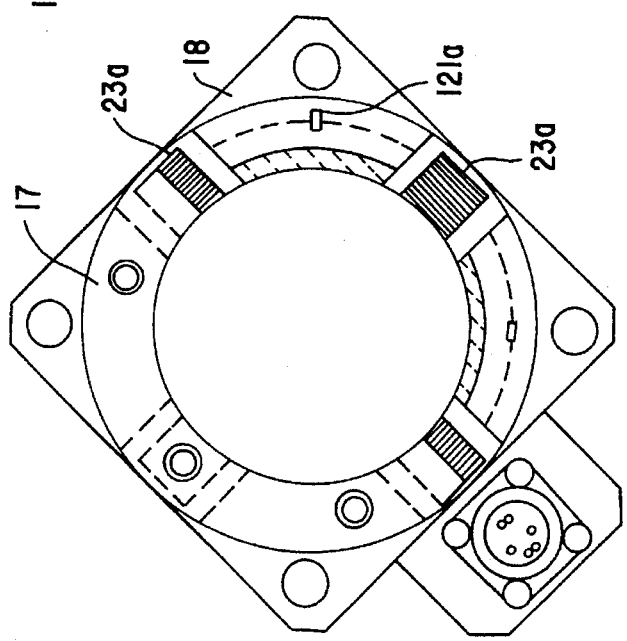
Figure 9C:
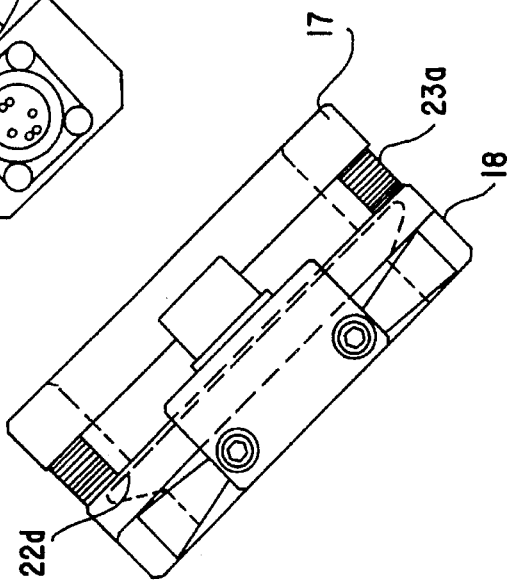

In the case of the dresser 25, the dress 102 is fed by the manner substantially identical to that mentioned above to perform the dressing operation to the grinding stone 103 now clogged. As shown in FIGS. 8 and 9, in a case where a member provided with a contact detection means has a strain gauge 121a as a displacement detection type contact detection means and a piezoelectric element 23a as a minutely biasing means, such an effect as improvement in an attenuation or damping ability mentioned with reference to FIG. 5C can be attained in addition to the functions and effects mentioned above with reference to the embodiment of FIG. 3B.

In the embodiment of FIGS. 10 and 11, the member is composed of the elastic member 19, the strain gauge 121b and the piezoelectric element 23a forming the minutely biasing means, and in this embodiment, such an effect as improvement in an attenuation or damping ability mentioned with reference to FIG. 5C can be also attained in addition to the functions and effects mentioned above with reference to the embodiment of FIG. 3C.

Further, in the embodiment of FIGS. 12 and 13, in which the contact detection means 12 is provided with the strain gauge 121a, such functions and effects as those mentioned with reference to FIG. 3A can be achieved.

Figure 16:
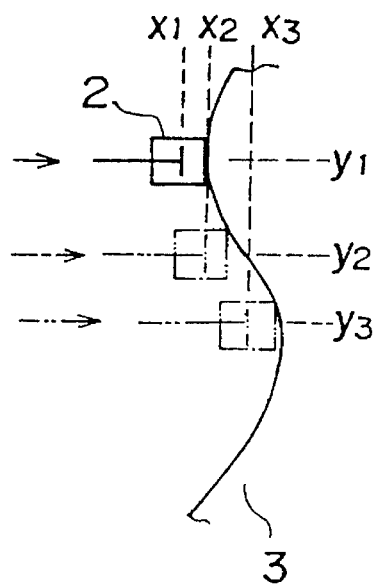
FIGS. 16A to 16D are views showing cutting conditions of the grinding stone with respect to the work at various contacting positions therebetween.
Figure 16:
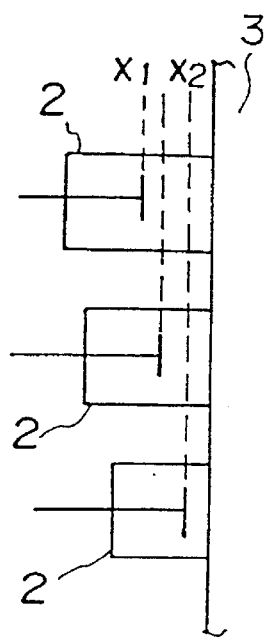
Figure 16:
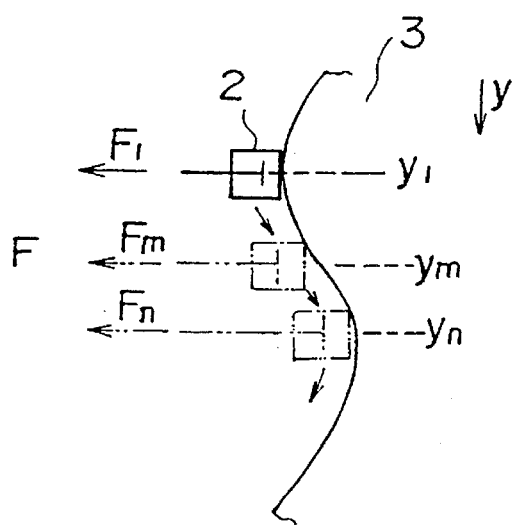
Figure 16:
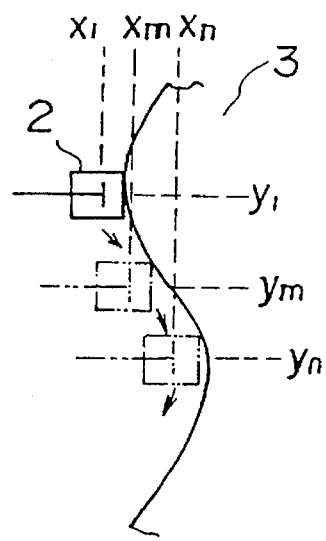

In the example of circuit of FIG. 14A, the detection is performed at a plurality of contact portions as shown in FIG. 16A, and the coordinates $(x_1, y_1), (x_2, y_2), (x_3, y_3)$, at the contact detections of these portions are read by the coordinate detection circuit 50 thereby to measure the shape of the work 3. In this example, when, as shown in FIG. 16B, the shape of the work 3 is preliminarily known and the grinding stone abuts against a reference stretch having a high hardness difficult to be cut in an abutment of the grinding stone to perform the contact detection, the coordinate $x_1$ at the contact detection time is first read and the coordinate $x_1$ at a time when the grinding stone 2 again abuts against the work 3 after the use of the grinding stone 2 is then read, whereby an amount of wearing of the grinding stone 2 can be detected or measured. According to this example, since the shape of the work 3 can be measured by using the contact detection means 12, it is not necessary to additionally locate any measuring means, thus being convenient.

In a structure utilizing the measuring means, it is necessary to once stop the movement of the work at the time of measuring the work, but in the present example, the shape thereof can be measured even during the movement of the work 3, thus being advantageous.

In the example of the circuit of FIG. 14B, the work reaction force received to the grinding stone 2 from the work 3 during the working time is transferred to the feed shaft unit 4. The working force is then converted into an electric signal by means of the working force measuring circuit 51 and the measurement can be done through the electric signal. According to this operation, since the magnitude of the working force is detected, the shape of the work can be measured by this example of FIGS. 16C and 16D.

That is, in the example of FIG. 16C, the working force F $(F_1, F_2, - - - F_m, - - -, F_n - - -)$ received from the grinding stone 2 at the position y $(y_1, Y_2, - - - Y_m, - - -, Y_n - -)$ in the moving direction of the grinding stone 2 along the work 3 is read, and the shape is therefore read from the force F and the position y corresponding to the force F. The reason why the shape can be measured by reading the force F is based on the fact that the grinding stone 2 is strongly pressed back at a protruded portion of the work 3 and weakly pressed back, reversely, at a recessed portion, whereby the shape can be calculated and measured by reading the work reaction forces at the respective protruded and recessed portions of the work 3.

In the example of FIG. 16D, the grinding stone 2 is moved along the work 3 with the work reaction force applied to the grinding stone being maintained to be substantially zero (0), the position x $(x_1, x_2, - - -, x_m, - - -, x_n - -)$ displaced to make substantially zero (0) the work reaction force at the position y $(y_1, Y_2, - - - y_m, - - -, y_n - - -)$ in the moving direction of the grinding stone 2 is read, and thereafter, the shape of the work can be calculated and read by the coordinates of $(x_1, y_1), - - - (x_2, y_2), - - -, (x_m, y_m), - - -, (x_n, y_n), - - -$.

Furthermore, it becomes possible to detect the finish of the working by detecting the magnitude of the work reaction force for the reason that when the working has been finished through a spark out, the work reaction force applied to the grinding stone 2 is changed instantaneously at its moment, whereby the finish of the working can be detected by detecting this fact, thus minimumly eliminating loss time after the actual working of the grinding stone 2, being advantageous.

The fact that the magnitude of the work reaction force can be obtained leads to the detection of the clogging through the lowering of the working ability of the grinding stone 2. That is, when the clogging is caused during the grinding operation to the work 3, the work reaction force increases and the clogging, resulting in the lowering of the working ability of the tool, can thus be detected by detecting the increasing of the reaction force.

Moreover, since the magnitude of the working reaction force is detected, the grinding force can be also detected through the mutual relationship of grinding force being proportional to the work reaction force.

The following grinding manners or modes will be taken by detecting the grinding force.

Figure 17A:
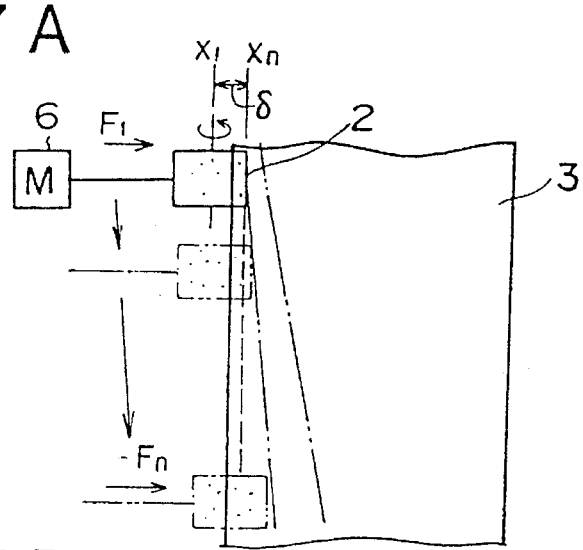
FIGS. 17A to 17D are views showing various methods of measuring the shape of the work.

First, as shown in FIG. 17A, the work 3 can be ground so as to provide a predetermined shape ( tapered shape in the illustration) by controlling the position and the grinding force of the grinding stone 2 by means of the motor 6 so as to satisfy the following equation (1)

$$(F_n - F_1)/(x_n - x_1) = \text{constant} \tag{1}$$

Figure 17B:
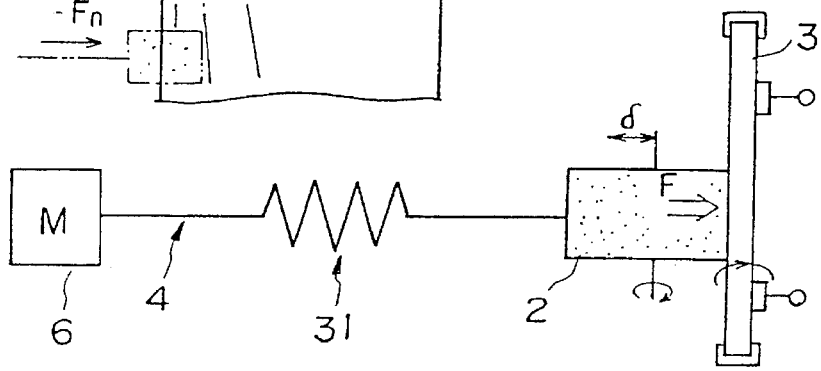
Figure 17C:
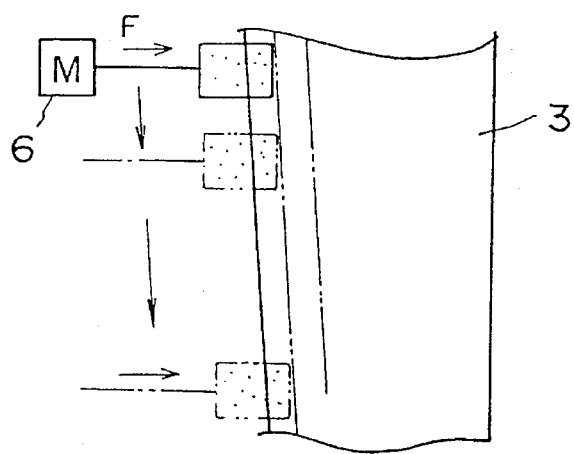

This mode will be called a compliance mode because it is assumed that a virtual spring 31 having a constant spring constant is as if provided for the feed shaft unit 4 as shown in FIG. 17B. In the compliance mode, a state assuming the virtual spring constant being indefinite corresponds to a rigid state provided with no such virtual spring. The mode of this state is a position control mode in which the work is cut at once in a predetermined shape.

Figure 17D:
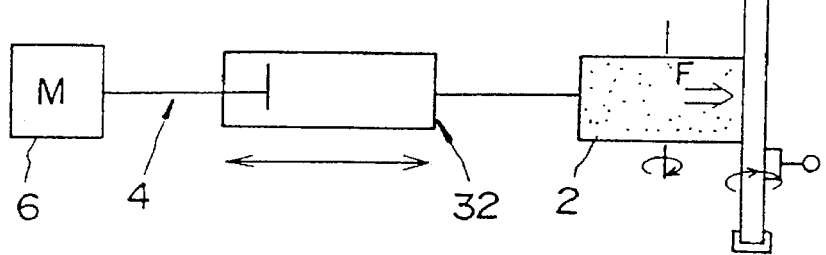

On the contrary, a state assuming the virtual spring constant being made extremely small is a force control mode in which the work is cut repeatedly step wisely to gradually obtain the predetermined shape of the work. This mode will be called a force constant mode because it is assumed that a virtual cylinder 32 keeping a force constant is as if provided for the feed shaft unit 4 as shown in FIG. 17D.

Figure 18A:
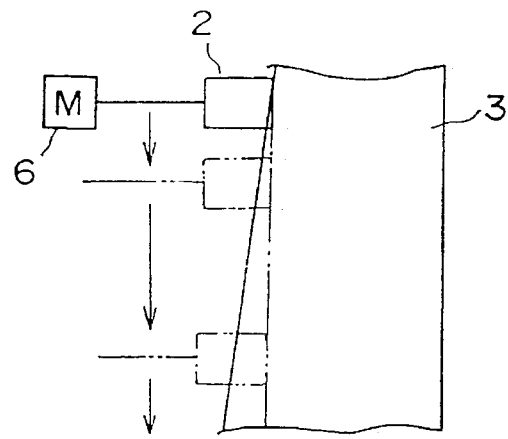
FIG. 18A is a view showing a cutting state of the grinding stone.

In the example of the circuit of FIG. 14C, a voltage corresponding to the command value is applied to the piezoelectric element 23a by means of the amplifier 41 and the piezoelectric element 23a is minutely expanded or contracted in response to the applied voltage, thus making it possible to minutely cut the work with high performance. In addition, as shown in FIG. 18A, it becomes possible to cut the work at constant amount with high performance by feeding back the amount to be cut from the contact detection means 12 through the coordinate detection circuit 50.

Figure 18B:
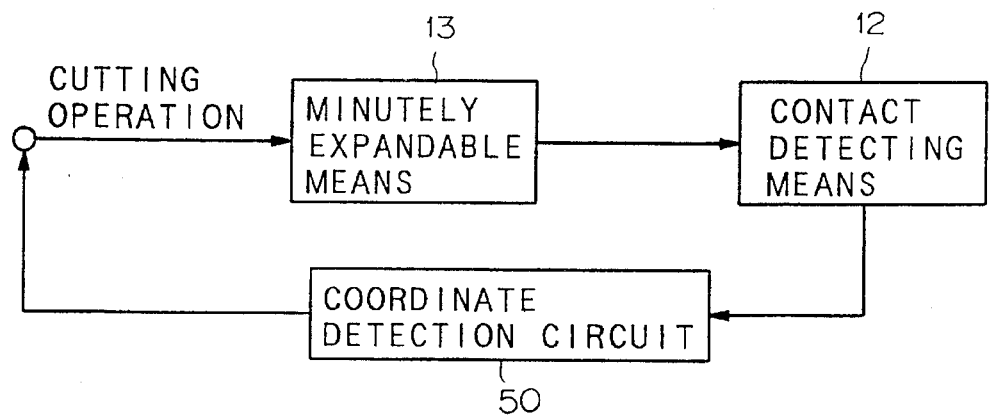
FIG. 18B is a block for showing one example of a controlling to make constant the cut amount.
Figure 18C:
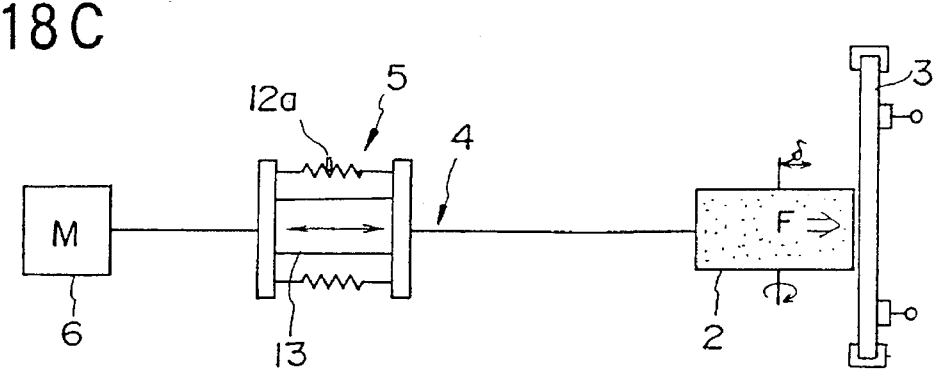
FIG. 18C represents a position control mode.

In general, when the grinding stone cuts a protruded portion of a work, the grinding stone receives a strong reaction force and the grinding stone is forced back, and it is therefore difficult to make and keep constant the amount to be cut. However, in the embodiment of the present invention, as shown in FIG. 18B, for example, the displaced amount forced back is detected by the coordinate detection circuit 50, and the detected amount is fed back and the cut amount is instructed to the minutely expandable means 13, whereby the cutting or grinding operation can be done with the constant cut amount being always maintained without driving the motor 6. This is assumed as if the feed screw unit 4 is in the rigid state, which corresponds to the position control mode described hereinbefore as shown in FIG. 18C. In this example, the position control is performed by the minutely expandable means 13 without operating the motor 6, thus the mode of this example being called minute cut amount constant mode.

In the case of the circuit of FIG. 14D, the aimed shape of the work is inputted by means of the NC 37 and the dimension is controlled by the coordinate detection circuit 50 or dimension measuring device 42. As this result, in a case where degree of tapering or circularity of the work does not accord with the aimed shape and a correction is hence required, the correction in working can be easily done only by controlling the expansion or contraction of the minutely expandable means 13 by means of the working correction circuit 52.

That is, there is no need for changing an NC program every time the working correction which is done in the conventional technique by operating the motor to move the feed screw shaft, and accordingly, such troublesome operation can be eliminated by the present invention.

Figure 19A:
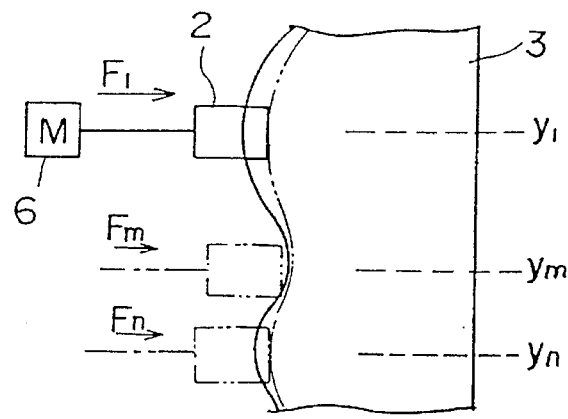
FIG. 19A is a view showing a cutting state of the grinding stone.

In the example of the circuit of FIG. 14E, the grinding operation can be done while controlling the grinding force to a desired value by means of the working force measuring circuit 51 as shown in FIG. 19A.

Figure 19B:
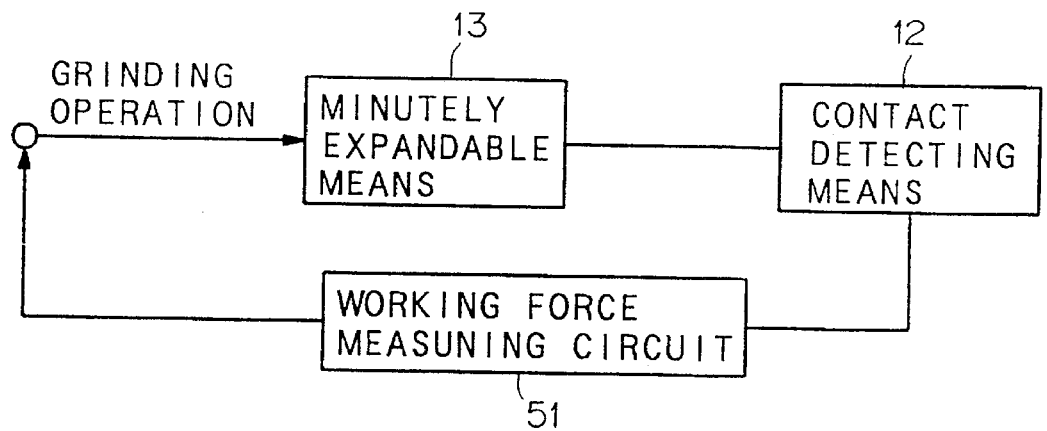
FIG. 19B is a block for showing another example of a controlling to make constant the cut amount.

Namely, at the position $y_1$ at which the work has a large protruded portion, the grinding stone is controlled so as to apply a large force $F_1$, whereas at the position $Y_m$ at which the work has a small protruded portion, the grinding stone is controlled so as to apply a small force $F_m$. As shown in FIG. 19B, the work reaction force is detected by the contact detection means 12b and the detected value is fed back so that the grinding force is instructed to the minutely expandable means 13, whereby the grinding operation can be performed under the control of the grinding force to a desired value.

Figure 19C:
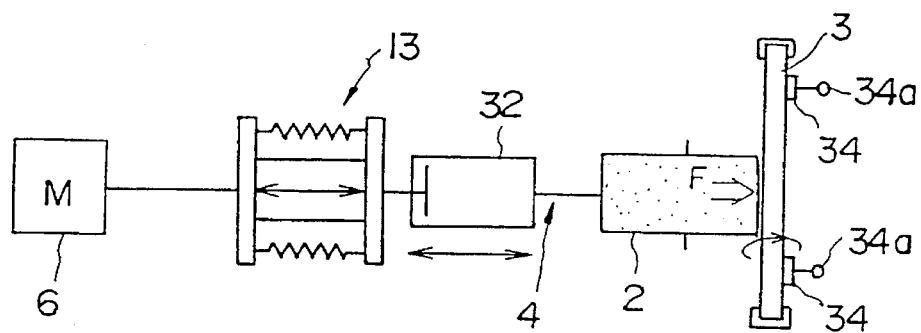
FIG. 19C represents a cut amount constant control mode.

This operation mode is assumed as if the virtual cylinder 32 is provided for the feed shaft unit 4 as shown in FIG. 19C, so that this mode is similar to the force constant mode described hereinbefore. However, in this example of the present invention, the force is controlled by the minutely expandable member 13 without utilizing the motor 6 and the force is controlled to a desired value, not a constant value, thus this mode being called a force detection minute cut mode. According to this force detection minute cut mode, it is not necessary to adjust the grinding force by adjusting a screw 34a of the bracing means 34 as done in the conventional technique, thus making simple the working. In addition, according to this mode, it becomes possible to handle a work having a specific shape such as having a spline groove or spiral groove.

In the example of the circuit of FIG. 14F, it was found through an experiment that an attenuation against a chatter at the time of grinding can be improved by preliminarily applying a high voltage to the piezoelectric element or electrostriction element 23a by the attenuation improving circuit 53. Furthermore, the attenuation against the chatter can be further improved and the magnitude of the chatter can be also suppressed by detecting the condition of the chatter by the contact detection means as an amount of displacement or work reaction force and controlling the voltage to be applied to the piezoelectric element or electrostriction element 23a in accordance with the detected condition of the chatter.

It is also possible to prepare a model of a data base as knowledge by storing and evaluating informations relating to the cut amount, the work shape, the grinding force, etc..

Furthermore, it will be made possible to preliminarily make amendment to phenomena precast or preliminarily expected through the thus obtained data base model.

What is claimed is:

1. A machine tool, comprising:

a tool for working a workpiece;

a feed shaft unit for moving one of the tool and the workpiece to contact them to each other, said feed shaft unit being provided with a feed screw shaft;

a contact detection means provided for said feed shaft unit for detecting contact between the tool and the work to be worked; and a nut member screw engaged with the feed screw shaft, said nut member being provided with a minutely expandable means for minutely expanding or contracting in an axial direction of the nut member.

2. A machine tool according to claim 1, further comprising a cut amount setting means for setting a cut amount, a control unit for outputting a command value in response to the set value, an amplifier for amplifying a voltage of a value corresponding to the command value and a piezoelectric element as a minutely biasing means to which that voltage is applied, said control unit and said amplifier constituting an attenuation improving means.

3. A machine tool according to claim 1, wherein said minutely expandable means includes a minutely expandable member which is expanded or contracted in the axial direction of the nut member.

4. A machine tool according to claim 3, wherein said contact detection means is secured to said minutely expandable member.

5. A machine tool according to claim 4, wherein said contact detection means and said minutely expandable means are disposed in parallel to each other with respect to an axial direction of a feed shaft.

6. A machine tool according to claim 4, wherein said contact detection means and said minutely expandable means are disposed in series to each other with respect to an axial direction of a feed shaft.

7. A machine tool according to claim 4, wherein said contact detection means and said minutely expandable means are disposed in combination of parallel and series arrangement to each other with respect to an axial direction of a feed shaft.

8. A machine tool according to claim 1, wherein a control means is operatively connected to said contact detection means acting to convert a physical amount varied by a working reaction force when the tool contacts the workpiece into an electric signal and a coordinate detection means for obtaining coordinate of a position at which the tool contacts the workpiece in response to the signal from the contact detection means.

9. A machine tool according to claim 1, wherein said contact detection means acts to convert a variation due to a work reaction force at a time of contacting of the tool to the workpiece into an electric signal, and further comprising a working force measurement means for converting a working force acting at the contacting time to an electric signal and measuring the signal and a numerical control unit for discriminating the fact of contacting or not-contacting in response to the working force calculated by the working force measurement means and controlling a motor in response to the discrimination.

10. A machine tool according to claim 1, further comprising a control unit transmitting a command value for enabling a high resolution feeding, a D/A converter for converting the command value into an analog value, an amplifier for amplifying a voltage of a value corresponding to the converted command value and a piezoelectric element constituting a minutely expandable means expandable in response to that voltage, and wherein said contact detection means serves to detect a cut amount varied in accordance with the degree of expansion of the minutely expandable means.

11. A machine tool according to claim 1, further comprising a numerical control unit inputting an aimed shape of the workpiece, a control unit transmitting a command in response to the inputted value from the numerical control unit, an A/D converter for converting the outputted value into an analog signal, an amplifier for amplifying a voltage of a value corresponding to the converted analog signal, a piezoelectric element constituting a minutely expandable means expandable in response to that voltage, another amplifier for amplifying the value detected by the contact detection means and another A/D converter for converting the value amplified by the another amplifier into a digital value and then inputting the digital value to the control unit, and wherein said contact detection means connected to the coordinate detection means serves to detect a dimension variable in accordance with a minute cut amount varied in accordance with the degree of expansion of the minutely expandable means.

12. A machine tool according to claim 1, further comprising a working force measurement means for converting the working force acting between the tool and the workpiece at the contacting time thereof into an electric signal and measuring the working force from the signal, a control unit for outputting a command value in accordance with the measured result of the working force measurement means, an amplifier for amplifying a value of voltage corresponding to the command value and a piezoelectric element as a minutely biasing means to which that voltage is applied.

* * * * *